United States Patent
Wang et al.

(10) Patent No.: US 9,900,259 B2
(45) Date of Patent: Feb. 20, 2018

(54) DATA TRANSMISSION METHOD AND RELATED APPARATUS TO COMPRESS DATA TO BE TRANSMITTED ON A NETWORK

(71) Applicant: Huawei Technologies Co., Ltd., Shenzhen, Guangdong (CN)

(72) Inventors: Enbo Wang, Shanghai (CN); Chenghui Peng, Shanghai (CN); Ganghua Yang, Boulogne (FR); Wenyuan Yong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 264 days.

(21) Appl. No.: 14/812,878

(22) Filed: Jul. 29, 2015

(65) Prior Publication Data

US 2015/0334033 A1   Nov. 19, 2015

Related U.S. Application Data

(63) Continuation of application No. PCT/CN2014/071415, filed on Jan. 24, 2014.

(30) Foreign Application Priority Data

Jan. 30, 2013   (CN) .......................... 2013 1 0036734

(51) Int. Cl.
*H04L 12/28*   (2006.01)
*H04L 12/811*   (2013.01)
(Continued)

(52) U.S. Cl.
CPC .......... *H04L 47/38* (2013.01); *H04L 12/4633* (2013.01); *H04L 69/04* (2013.01); *H04L 69/22* (2013.01)

(58) Field of Classification Search
USPC .......................................................... 370/389
See application file for complete search history.

(56) References Cited

U.S. PATENT DOCUMENTS 6,920,125 B1   7/2005   Wu
7,263,089 B1   8/2007   Hans et al.
(Continued)

FOREIGN PATENT DOCUMENTS

CN   101663867 A   3/2010
CN   102065098 A   5/2011
(Continued)

OTHER PUBLICATIONS

C. Bormann, et al., "RObust Header Compression (ROHC): Framework and four profiles: RTP, UDP, ESP, and uncompressed", Network Working Group, Jul. 2001, 168 pages.
(Continued)

*Primary Examiner* — Farah Faroul

(57) ABSTRACT

Embodiments of the present invention disclose a data transmission method and a related apparatus, which are used to implement compression of data transmitted on a backhaul to increase throughput of the backhaul. The method in the embodiments of the present invention includes: parsing a received Internet Protocol (IP) data packet to obtain a transmission network protocol header, a transmission tunneling protocol header, a user data protocol header, and user application layer data; compressing the transmission tunneling protocol header, the user data protocol header, and the user application layer data to obtain a compressed transmission network protocol payload; using the transmission network protocol header to encapsulate the compressed transmission network protocol payload to obtain a compressed IP data packet; and sending the compressed IP data packet to a decoding device in a core network or in a base station.

14 Claims, 16 Drawing Sheets

(51) Int. Cl.
*H04L 29/06* (2006.01)
*H04L 12/46* (2006.01)

(56) References Cited

U.S. PATENT DOCUMENTS

| | | | | |
|---|---|---|---|---|
| 2008/0260389 A1* | 10/2008 | Zheng | ................ | H04Q 11/0067 398/115 |
| 2008/0267217 A1 | 10/2008 | Colville et al. | | |
| 2009/0003296 A1* | 1/2009 | Zheng | ................ | H04W 92/045 370/338 |
| 2010/0046418 A1* | 2/2010 | Horn | ................ | H04W 40/22 370/315 |
| 2012/0020278 A1* | 1/2012 | Moberg | ................ | H04B 7/155 370/315 |
| 2012/0155375 A1* | 6/2012 | Zhu | ................ | H04B 7/155 370/315 |
| 2012/0294211 A1* | 11/2012 | Zhu | ................ | H04W 28/06 370/310 |

FOREIGN PATENT DOCUMENTS

| | | | |
|---|---|---|---|
| CN | 102075287 A | 5/2011 | |
| CN | 102098725 A | 6/2011 | |
| WO | WO 2008/027775 A2 | 3/2008 | |

OTHER PUBLICATIONS

M. Degermark, et al., "IP Header Compression", Network Working Group, Feb. 1999, 47 pages.

"3rd Generation Partnership Project: Technical Specification Group Radio Access Network; Medium Access Control (MAC) protocol specification (Release 11)", 3GPP TS 25.321 V11.3.0, Dec. 2012, 207 pages.

"3rd Generation Partnership Project: Technical Specification Group Radio Access Network; Radio Link Control (RLC) protocol specification", 3GPP TS 25.322 V11.1.0, Dec. 2012, 90 pages.

"3rd Generation Partnership Project: Technical Specification Group Radio Access Network; UTRAN Iub Interface Data Transport and Transport Signalling for Common Transport Channel Data Streams (Release 11)", 3GPP TS 25.434 V11.0.0, Sep. 2012, 12 pages.

"3rd Generation Partnership Project: Technical Specification Group Radio Access Network; Packet Data Convergence Protocol (PDCP) specification (Release 11)" 3GPP TS 25.323 V11.0.0, Sep. 2012, 43 pages.

"3rd Generation Partnership Project: Technical Specification Group Radio Access Network; High Speed Packet Access (HSPA) evolution; Frequency Division Duplex (FDD) (Release 7)", 3GPP TR 25.999 V7.1.0, Mar. 2008, 59 pages.

* cited by examiner

DATA TRANSMISSION METHOD AND RELATED APPARATUS TO COMPRESS DATA TO BE TRANSMITTED ON A NETWORK

CROSS-REFERENCE TO RELATED APPLICATIONS

This application is a continuation of International Application No. PCT/CN2014/071415, filed on Jan. 24, 2014, which claims priority to Chinese Patent Application No. 201310036734.0, filed on Jan. 30, 2013, both of which are hereby incorporated by reference in their entireties.

TECHNICAL FIELD

The present invention relates to the field of communications technologies, and in particular, to a data transmission method and a related apparatus.

BACKGROUND

To ensure bandwidth required for development of mobile services, base stations are deployed increasingly densely. Bandwidth required by backhaul increases continuously, and Backhaul capacity expansion cannot keep pace with a growth speed of mobile traffic. Backhaul capabilities become a critical bottleneck that constrains development of mobile broadband. As pressure of an operating expense increases gradually and bandwidth pressure occurs due to development of data services, Backhaul data transmission becomes a hot issue that an operator is most concerned with.

To implement site capacity expansion and optimize Backhaul transmission, physical capacity expansion may be performed on a Backhaul to increase transmission resources. However, the physical capacity expansion causes a cost rise. Therefore, compression of data transmitted on a Backhaul becomes a preferred method for optimizing a wireless transmission system.

In an existing radio network protocol stack, two data compression mechanisms are available.

(1) A Packet Data Convergence Protocol (PDCP, Packet Data Convergence Protocol) layer in a radio interface protocol structure provides "header compression" for an Internet Protocol (IP, Internet Protocol) data stream transmitted at an upper layer of the PDCP layer. For example, headers of the following protocols in the IP data stream are compressed: the Transmission Control Protocol/Internet Protocol (TCP/IP, Transmission Control Protocol/Internet Protocol), or Real-time Transport Protocol (RTP, Real-time Transport Protocol)/User Datagram Protocol (UDP, User Datagram Protocol)/Internet Protocol (IP, Internet Protocol). Header compression algorithms mentioned in the TS 25.323 standard include an IP header compression (IP Header Compression) algorithm and a robust header compression (ROHC, Robust Header Compression) algorithm.

(2) A user data application layer provides data compression, which depends on configuration of the application layer itself.

During a process of implementing the present invention, inventors of the present invention find that: in method (1), the PDCP layer can provide data compression for an IP data stream only, that is, only a user data protocol header is compressed, where a good effect is achieved when a payload (Payload) is small, but a compression effect is limited when a Payload is large; for method (2), data compression is not configured for all data application layers.

In conclusion, the foregoing two data compression methods are both targeted at data of a single user, and their compression effects depend on a service type (for example, a Payload size and configuration of an application layer). An overall effect of data compression is limited. Therefore, how to improve compression of data transmitted on a Backhaul to increase throughput of the Backhaul becomes a difficulty discussed in the industry.

SUMMARY

Embodiments of the present invention provide a data transmission method and a related apparatus, which are used to compress data transmitted on a Backhaul to increase throughput of the Backhaul.

The embodiments of the present invention provide the following technical solutions:

According to a first aspect, an embodiment of the present invention provides a data transmission method, including:

parsing a received Internet Protocol IP data packet to obtain a transmission network protocol header, a transmission tunneling protocol header, a user data protocol header, and user application layer data;

compressing the transmission tunneling protocol header, the user data protocol header, and the user application layer data to obtain a compressed transmission network protocol payload;

using the transmission network protocol header to encapsulate the compressed transmission network protocol payload to obtain a compressed IP data packet; and sending the compressed IP data packet to a core network or a base station.

With reference to the first aspect, in a first possible implementation manner of the first aspect, the transmission network protocol header includes a transmission network IP protocol header and a transmission network transmission layer protocol header; and the parsing a received Internet Protocol IP data packet to obtain a transmission network protocol header includes:

acquiring complete transmission network IP packet data;

determining the transmission network IP protocol header and a length of the transmission network IP protocol header according to a header of the transmission network IP packet data;

determining a protocol type of a transmission network transmission layer protocol according to a protocol type field in the header of the transmission network IP packet data, and then determining the transmission network transmission layer protocol header and a length of the transmission network transmission layer protocol header according to the protocol type of the transmission network transmission layer protocol;

acquiring a length of the transmission network protocol header according to the transmission network IP protocol header and the transmission network transmission layer protocol header, where the length of the transmission network protocol header is the length of the transmission network IP protocol header plus the length of the transmission network transmission layer protocol header; and acquiring the transmission network protocol header according to the transmission network IP packet data and the length of the transmission network protocol header.

With reference to the first aspect, in a second possible implementation manner of the first aspect, the parsing a received Internet Protocol IP data packet to obtain a transmission tunneling protocol header includes:

obtaining a protocol type of a transmission tunneling protocol, and calculating a length of a fixed header of the transmission tunneling protocol according to the protocol type of the transmission tunneling protocol;

determining, according to the protocol type of the transmission tunneling protocol, whether any optional field exists in the transmission tunneling protocol header;

if no optional field exists, determining a length of the transmission tunneling protocol header according to the length of the fixed header of the transmission tunneling protocol, where the length of the transmission tunneling protocol header is the length of the fixed header of the transmission tunneling protocol;

if an optional field exists, determining, according to a field corresponding to the protocol type of the transmission tunneling protocol, whether any extension header exists in the transmission tunneling protocol header, and if an optional field exists but no extension header exists, determining the length of the transmission tunneling protocol header according to the length of the fixed header of the transmission tunneling protocol and a length of the optional field, where the length of the transmission tunneling protocol header is the length of the fixed header of the transmission tunneling protocol plus the length of the optional field, or if an optional field exists and an extension header exists, determining the length of the transmission tunneling protocol header according to the length of the fixed header of the transmission tunneling protocol, a length of the optional field, and a length of the extension header, where the length of the transmission tunneling protocol header is the length of the fixed header of the transmission tunneling protocol plus the length of the optional field plus the length of the extension header; and determining the transmission tunneling protocol header according to the transmission network IP packet data and the length of the transmission tunneling protocol header.

With reference to the first aspect, in a third possible implementation manner of the first aspect, the user data protocol header includes a length of a user data IP protocol header and a user data transmission layer protocol header; and the parsing a received Internet Protocol IP data packet to obtain a user data protocol header includes:

acquiring complete user data IP packet data;

acquiring the length of the user data IP protocol header according to a header of the user data IP packet data;

determining a protocol type of a user data transmission layer protocol according to a protocol type field in the header of the user data IP packet data, acquiring the user data transmission layer protocol header according to the protocol type of the user data transmission layer protocol, and acquiring a length of the user data transmission layer protocol header according to the user data transmission layer protocol header;

acquiring a length of the user data protocol header according to the length of the user data IP protocol header and the length of the user data transmission layer protocol header, where the length of the user data protocol header is the length of the user data IP protocol header plus the length of the user data transmission layer protocol header; and acquiring the user data protocol header according to the transmission network IP packet data and the length of the user data protocol header.

With reference to the first aspect or the first or second or third possible implementation manner of the first aspect, in a fourth possible implementation manner, the compressing the transmission tunneling protocol header, the user data protocol header, and the user application layer data to obtain a compressed transmission network protocol payload includes:

performing header compression for the transmission tunneling protocol header and the user data protocol header to obtain a first result of header compression;

compressing the user application layer data to obtain compressed user application layer data; and encoding the first result of header compression and the compressed user application layer data to obtain the compressed transmission network protocol payload.

With reference to the first aspect or the fourth possible implementation manner of the first aspect, in a fifth possible implementation manner, after the using the transmission network protocol header to encapsulate the compressed transmission network protocol payload to obtain a compressed IP data packet, the method further includes:

determining whether a length of the compressed IP data packet is greater than a length of a maximum transmission unit of a lower layer protocol, and if the length of the compressed IP data packet is greater than the length of the maximum transmission unit of the lower layer protocol, performing IP fragmentation for the compressed IP data packet to obtain compressed IP data packet fragments, where the lower layer protocol includes a protocol directly used to transmit the compressed IP data packet; and the sending the compressed IP data packet to a core network or a base station includes:

sending the compressed IP data packet fragments to the core network or the base station.

According to a second aspect, an embodiment of the present invention further provides a data transmission method, including: parsing a received Internet Protocol IP data packet to obtain a transmission network protocol header, a transmission tunneling protocol header, a user data protocol header, and user application layer data;

compressing the user application layer data to obtain a compressed user data protocol payload;

using the user data protocol header, the transmission tunneling protocol header, and the transmission network protocol header to encapsulate the compressed user data protocol payload to obtain a compressed IP data packet; and sending the compressed IP data packet to a core network or a base station.

According to a third aspect, an embodiment of the present invention further provides a data transmission method, including:

acquiring a Medium Access Control protocol data unit MAC PDU;

decoding the MAC PDU according to the Medium Access Control Protocol MAC, the Radio Link Control Protocol RLC, and the Packet Data Convergence Protocol PDCP in sequence to obtain a Packet Data Convergence Protocol protocol data unit PDCP PDU;

using a user data protocol header to decode the PDCP PDU to obtain decoded data;

compressing the decoded data to obtain compressed data;

encapsulating the compressed data according to the user data protocol header, PDCP, RLC, and MAC in sequence to obtain encapsulated data; and sending the encapsulated data to a core network or a base station.

With reference to the third aspect, in a first possible implementation manner of the third aspect, the acquiring a Medium Access Control protocol data unit MAC PDU includes:

receiving Iub encapsulated data; and decoding the received Iub encapsulated data according to an Iub interface protocol to obtain the MAC PDU;

or receiving a MAC PDU sent by a protocol processing module of the base station or a protocol processing module of a radio network controller RNC.

With reference to the first possible implementation manner of the third aspect, in a second possible implementation manner, the decoding the received Iub encapsulated data according to an Iub interface protocol to obtain the MAC PDU includes:

when the Iub encapsulated data is an IP data packet in which IP fragments exist, performing IP fragment reassembly for the IP data packet in which IP fragments exist, to acquire complete transmission network IP packet data;

decoding the transmission network IP packet data according to the Internet Protocol IP and the User Datagram Protocol UDP to obtain a UDP payload; and decoding the UDP payload according to the Frame Protocol FP to obtain the MAC PDU.

With reference to the third aspect, in a third possible implementation manner of the third aspect, the decoding the MAC PDU according to the Medium Access Control Protocol MAC, the Radio Link Control Protocol RLC, and the Packet Data Convergence Protocol PDCP in sequence to obtain a Packet Data Convergence Protocol protocol data unit PDCP PDU includes:

decoding the MAC PDU at a MAC layer to obtain an RLC PDU; and decoding the RLC PDU at an RLC layer, and then performing PDCP decoding and reassembly for the decoded RLC PDU to obtain the PDCP PDU.

According to a fourth aspect, an embodiment of the present invention further provides a data transmission method, including:

acquiring a Medium Access Control protocol data unit MAC PDU;

decoding the MAC PDU according to the Medium Access Control Protocol MAC and the Radio Link Control Protocol RLC in sequence to obtain decoded data;

compressing the decoded data to obtain compressed data;

encapsulating the compressed data according to RLC and MAC in sequence to obtain encapsulated data; and sending the encapsulated data to a core network or a base station.

According to a fifth aspect, an embodiment of the present invention further provides a data transmission method, including:

receiving a compressed Internet Protocol IP data packet;

decoding a transmission network protocol header, a transmission tunneling protocol header, and a user data protocol header in the compressed IP data packet to obtain a compressed user data protocol payload;

decompressing the compressed user data protocol payload to obtain user application layer data;

using the transmission network protocol header, the transmission tunneling protocol header, and the user data protocol header to encapsulate the user application layer data to obtain an IP data packet; and sending the IP data packet to a core network or a base station.

According to a sixth aspect, an embodiment of the present invention further provides a data transmission device, including an IP data packet parsing unit, a compressing unit, an encapsulating unit, and a sending unit, where:

the IP data packet parsing unit is configured to parse a received Internet Protocol IP data packet to obtain a transmission network protocol header, a transmission tunneling protocol header, a user data protocol header, and user application layer data;

the compressing unit is configured to compress the transmission tunneling protocol header, the user data protocol header, and the user application layer data to obtain a compressed transmission network protocol payload;

the encapsulating unit is configured to use the transmission network protocol header to encapsulate the compressed transmission network protocol payload to obtain a compressed IP data packet; and the sending unit is configured to send the compressed IP data packet to a decoding device in a core network or in a base station.

According to a seventh aspect, an embodiment of the present invention further provides a data transmission device, including an IP data packet parsing unit, a compressing unit, an encapsulating unit, and a sending unit, where:

the IP data packet parsing unit is configured to parse a received Internet Protocol IP data packet to obtain a transmission network protocol header, a transmission tunneling protocol header, a user data protocol header, and user application layer data;

the compressing unit is configured to compress the user application layer data to obtain a compressed user data protocol payload;

the encapsulating unit is configured to use the user data protocol header, the transmission tunneling protocol header, and the transmission network protocol header to encapsulate the compressed user data protocol payload to obtain a compressed IP data packet; and the sending unit is configured to send the compressed IP data packet to a decoding device in a core network or in a base station.

As may be seen from the foregoing technical solutions, the embodiments of the present invention have the following advantages:

In an embodiment provided by the present invention, a received IP data packet is parsed to obtain a transmission network protocol header, a transmission tunneling protocol header, a user data protocol header, and user application layer data; then the transmission tunneling protocol header, the user data protocol header, and the user application layer data are compressed; and then the transmission network protocol header is used to encapsulate a compressed transmission network protocol payload to obtain a compressed IP data packet. In this optimization manner, compression of user application layer data may be implemented, and a compression rate of data transmitted on a Backhaul may be increased to increase throughput of the Backhaul.

In another embodiment provided by the present invention, a received IP data packet is parsed to obtain a transmission network protocol header, a transmission tunneling protocol header, a user data protocol header, and user application layer data; then the user application layer data is compressed; and then the user data protocol header, the transmission tunneling protocol header, and the transmission network protocol header are used to encapsulate a compressed user data protocol payload to obtain a compressed IP data packet. In this optimization manner, compression of user application layer data may be implemented, and a compression rate of data transmitted on a Backhaul may be increased to increase throughput of the Backhaul.

In another embodiment provided by the present invention, first a MAC PDU is acquired; then the MAC PDU is obtained by decoding according to MAC, RLC, and PDCP in sequence to obtain a PDCP PDU; a user data protocol header is used to decode the PDCP PDU to obtain decoded data; the decoded data is compressed to obtain compressed data; and then the compressed data is encapsulated according to the user data protocol header, PDCP, RLC, and MAC in sequence to obtain encapsulated data. In this optimization manner, compression of decoded data may be implemented, and a compression rate of data transmitted on a Backhaul may be increased to increase throughput of the Backhaul.

In another embodiment provided by the present invention, first a MAC PDU is acquired; the MAC PDU is obtained by decoding according to MAC and RLC in sequence to obtain decoded data; then the decoded data is compressed to obtain compressed data; and then the compressed data is encapsulated according to RLC and MAC in sequence to obtain encapsulated data. In this optimization manner, compression of decoded data may be implemented, and a compression rate of data transmitted on a Backhaul may be increased to increase throughput of the Backhaul.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings.

DETAILED DESCRIPTION

Embodiments of the present invention provide a data transmission method and a related apparatus, which are used to implement compression of data transmitted on a Backhaul to increase throughput of the Backhaul.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person skilled in the art based on the embodiments of the present invention shall fall within the protection scope of the present invention.

In the embodiments of the present invention, data transmission devices provided by the embodiments of the present invention are deployed at both ends of a backhaul link (Backhaul). During a complete data transmission process, in a data transmission direction, a data transmission device at one end of the backhaul link (also referred to as an encoding device) is configured to implement de-duplication of transmitted data, and a data transmission device at the other end of the backhaul link (also referred to as a decoding device) is configured to implement restoration of the transmitted data. The two data transmission devices are deployed at the two ends of the entire backhaul link, and configured to implement compression of the data transmitted on the backhaul link to increase throughput of the Backhaul. It should be pointed out that, either one of the data transmission devices deployed at the two ends of the backhaul link simultaneously implements the two functions of de-duplication and restoration to achieve a same optimization effect for data transmitted in the other direction. The data transmission device provided by the embodiments of the present invention may be an independent optimization device or a module integrated on a network element. The following separately describes how a data transmission device configured to implement data de-duplication and a data transmission device configured to implement data restoration specifically implement the present invention during a complete data transmission process. Data de-duplication and data restoration are later described separately by using independent embodiments.

Figure 1:
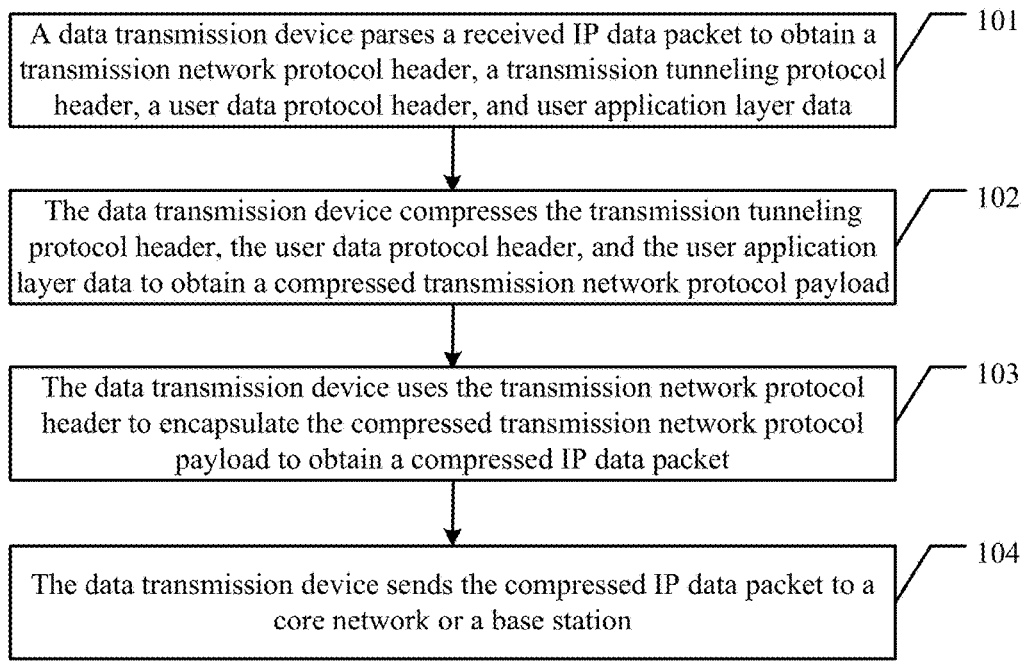
FIG. 1 is a schematic block flowchart of a data transmission method according to an embodiment of the present invention.

An implementation manner of data de-duplication in an embodiment of the present invention is first introduced. Referring to FIG. 1, an embodiment of the present invention provides a data transmission method, including:

101. A data transmission device parses a received Internet Protocol (IP, Internet Protocol) data packet to obtain a transmission network protocol header, a transmission tunneling protocol header, a user data protocol header, and user application layer data.

In this embodiment of the present invention, a data transmission device configured to implement data de-duplication (also referred to as an encoding device), which is deployed at one end of a Backhaul, first parses a standard IP data packet transmitted on the Backhaul, and may obtain a transmission network protocol header, a transmission tunneling protocol header, a user data protocol header, and user application layer data in sequence.

It should be noted that, in this embodiment of the present invention, the transmission network protocol header is a data header of a transmission network protocol, which may be briefed as the transmission network protocol header in this embodiment of the present invention; the transmission tunneling protocol header is a data header using a protocol type of a transmission tunneling protocol; and the user data protocol header is a data header using a protocol type of a user data protocol. After the three data headers corresponding to the transmission network protocol, the transmission tunneling protocol, and the user data protocol are truncated from the standard IP data packet, remaining data in the IP data packet is the user application layer data.

Optionally, the transmission network protocol header may include a transmission network IP protocol header and a transmission network transmission layer protocol header, where the transmission network protocol may include a transmission network IP protocol and a transmission network transmission layer protocol, the transmission network IP protocol header is a data header using a protocol type of the IP protocol at a transmission network layer, and the transmission network transmission layer protocol header is a data header using a protocol type of a transmission layer protocol at the transmission network layer.

Optionally, the transmission tunneling protocol header may include a General Packet Radio Service technology Tunneling Protocol User plane (GTP-U, GPRS Tunneling Protocol-User Plane) protocol header, the transmission tunneling protocol is specifically the GTP-U protocol, and the GTP-U protocol header is a data header using a protocol type of the GTP-U protocol.

Optionally, the user data protocol header may include a user data IP protocol header carried by the transmission tunneling protocol and a user data transmission layer protocol header, the user data protocol may include a user data IP protocol and a user data transmission layer protocol, the user data IP protocol header is a data header using a protocol type of the user data IP protocol at a radio network layer, and the user data transmission layer protocol header is a data header using a protocol type of the user data transmission layer protocol at the radio network layer.

Optionally, the user application layer data may include a payload (Payload) of the user data transmission layer protocol.

In this embodiment of the present invention, the data transmission device parses the standard IP data packet according to a protocol stack structure, and the transmission network protocol header, the transmission tunneling protocol header, the user data protocol header in the IP data packet are truncated in sequence as one part. For example, they may be collectively called a header block. After truncation of the IP data packet, the data transmission device truncates the remaining data as one part, and uses it as the user application layer data.

It should be noted that, for step 101, that a data transmission device parses a received Internet Protocol IP data packet to obtain a transmission network protocol header, a transmission tunneling protocol header, a user data protocol header, and user application layer data may be equivalently explained as the following four steps in terms of meanings:

A1. The data transmission device parses the received Internet Protocol IP data packet to obtain the transmission network protocol header.

A2. The data transmission device parses the received Internet Protocol IP data packet to obtain the transmission tunneling protocol header.

A3. The data transmission device parses the received Internet Protocol IP data packet to obtain the user data protocol header.

A4. The data transmission device parses the received Internet Protocol IP data packet to obtain the user application layer data.

For step A1, in a possible implementation manner, that the data transmission device parses the received IP data packet to obtain the transmission network protocol header may specifically include the following steps:

A11. When IP fragments exist in the received IP data packet, the data transmission device performs IP fragment reassembly for the IP data packet in which IP fragments exist, to acquire complete transmission network IP packet data.

A12. The data transmission device acquires the transmission network IP protocol header and a length of the transmission network IP protocol header according to a header of the transmission network IP packet data.

A13. The data transmission device determines a protocol type of the transmission network transmission layer protocol according to a protocol type field in the header of the transmission network IP packet data, and then acquires the transmission network transmission layer protocol header and a length of the transmission network transmission layer protocol header according to the protocol type of the transmission network transmission layer protocol. Further, specifically, the data transmission device acquires the transmission network transmission layer protocol header and a corresponding field according to the protocol type of the transmission network transmission layer protocol, and acquires the length of the transmission network transmission layer protocol header according to the transmission network transmission layer protocol header and the corresponding field.

A14. The data transmission device acquires a length of the transmission network protocol header according to the transmission network IP protocol header and the transmission network transmission layer protocol header, where the length of the transmission network protocol header is the length of the transmission network IP protocol header plus the length of the transmission network transmission layer protocol header.

A15. Acquire the transmission network protocol header according to the transmission network IP packet data and the length of the transmission network protocol header, where the transmission network protocol header is data from a beginning of the transmission network IP packet data and corresponding to a length that is the length of the transmission network protocol header.

In step A11, the data transmission device determines whether any IP fragments exist in the received IP data packet. When IP fragments exist in the IP data packet, the data transmission device performs IP fragment reassembly for the IP data packet to acquire the complete transmission network IP packet data, where the transmission network IP packet data is a result obtained after the data transmission device performs fragment reassembly for the standard IP data packet. An implementation manner of performing fragment reassembly for the IP data packet is not described herein again. For details, refer to the prior art.

In step A12, the data transmission device parses the header of the transmission network IP packet data according to features of the protocol stack structure, and may acquire the transmission network IP protocol header and the length of the transmission network IP protocol header. Then, in step A13, the data transmission device further acquires the length of the transmission network transmission layer protocol header. In step A14, after the data transmission device acquires the length of the transmission network IP protocol header and the length of the transmission network transmission layer protocol header, the data transmission device adds the length of the transmission network transmission layer protocol header to the length of the transmission network IP protocol header, and uses a sum as the length of the transmission network protocol header. Finally, in step A15, the data transmission device acquires the transmission network protocol header according to the transmission network IP packet data and the length of the transmission network protocol header, where data from a beginning of the transmission network IP packet data and corresponding to a length that is the length of the transmission network protocol header is the transmission network protocol header.

In a possible implementation manner of step A2, that the data transmission device parses the received Internet Protocol IP data packet to obtain the transmission tunneling protocol header, may include the following steps:

A21. The data transmission device calculates a length of a fixed header of the transmission tunneling protocol according to the protocol type of the transmission tunneling protocol.

A22. The data transmission device determines, according to a field corresponding to the protocol type of the transmission tunneling protocol, whether any optional field exists in the transmission tunneling protocol header.

A23. If no optional field exists, the data transmission device acquires a length of the transmission tunneling protocol header according to the length of the fixed header of the transmission tunneling protocol, where the length of the transmission tunneling protocol header is the length of the fixed header of the transmission tunneling protocol.

A24. If an optional field exists, the data transmission device determines, according to the field corresponding to the protocol type of the transmission tunneling protocol, whether any extension header exists in the transmission tunneling protocol header.

A25. If no extension header exists in the transmission tunneling protocol header, the data transmission device acquires the length of the transmission tunneling protocol header according to the length of the fixed header of the transmission tunneling protocol and a length of the optional field, where the length of the transmission tunneling protocol header is the length of the fixed header of the transmission tunneling protocol plus the length of the optional field.

A26. If an extension header exists in the transmission tunneling protocol header, the data transmission device acquires the length of the transmission tunneling protocol header according to the length of the fixed header of the transmission tunneling protocol, the length of the optional field, and a length of the extension header, where the length of the transmission tunneling protocol header is the length of the fixed header of the transmission tunneling protocol plus the length of the optional field plus the length of the extension header.

A27. The data transmission device acquires the transmission tunneling protocol header according to the transmission network IP packet data and the length of the transmission tunneling protocol header, where the transmission tunneling protocol header is data starting after the transmission network protocol header in the transmission network IP packet data and corresponding to a length that is the length of the transmission tunneling protocol header.

In step A21, the data transmission device first calculates the fixed header of the transmission tunneling protocol; then in step A22, the data transmission device determines whether any optional field exists. In step A24, in a case in which an optional field exists, the data transmission device determines whether any extension header exists in the transmission tunneling protocol header, and finally adds up the fixed header, the optional field, and the extension header to obtain the length of the transmission tunneling protocol header; if no extension header exists, the data transmission device adds up the fixed header and the optional field to obtain the length of the transmission tunneling protocol header; if no optional field exists, the length of the fixed header is the length of the transmission tunneling protocol header.

It should be noted that, in this embodiment of the present invention, there are also other implementation manners in which the data transmission device acquires the length of the transmission tunneling protocol header, which are only described herein and not limited. After the length of the transmission tunneling protocol header is acquired, the data starting after the transmission network protocol header in the transmission network IP packet data and corresponding to the length that is the length of the transmission tunneling protocol header, is used as the transmission tunneling protocol header. Herein, it should be pointed out that, in this embodiment of the present invention, the transmission tunneling protocol still carries data. By parsing the data carried by the transmission tunneling protocol, the user data protocol header and the user application layer data can be obtained.

It should be noted that, in an actual application, the protocol type of the transmission network transmission layer protocol may be specifically the Transmission Control Protocol (TCP, Transmission Control Protocol) or the User Datagram Protocol (UDP, User Datagram Protocol); the protocol type of the transmission tunneling protocol may be specifically the General Packet Radio Service technology (GPRS, General Packet Radio Service) Tunneling Protocol User plane (GTP-U, GPRS Tunnelling Protocol-User). The present invention is described with reference to specific protocol types in subsequent embodiments.

It should be noted that, in this embodiment of the present invention, after the data transmission device obtains the transmission tunneling protocol header in steps A1 and A2, if the transmission tunneling protocol still carries data, which is referred to as data carried by the transmission tunneling protocol, the data transmission device can obtain the user data protocol header and the user application layer data by parsing the data carried by the transmission tunneling protocol. That is, for step A3, in a possible implementation manner, that the data transmission device parses the received Internet Protocol IP data packet to obtain the user data protocol header may specifically include the following steps:

A31. When IP fragments exist in the received data carried by the transmission tunneling protocol, the data transmission device performs IP fragment reassembly for the data carried by the transmission tunneling protocol to acquire complete user data IP packet data.

A32. The data transmission device acquires a length of the user data IP protocol header according to a header of the user data IP packet data.

A33. The data transmission device acquires the protocol type of the user data transmission layer protocol according to a protocol type field in the header of the user data IP packet data, acquires the user data transmission layer protocol header and a corresponding field according to the protocol type of the user data transmission layer protocol, and acquires a length of the user data transmission layer protocol header according to the user data transmission layer protocol header and the corresponding field.

A34. The data transmission device acquires a length of the user data protocol header according to the length of the user data IP protocol header and the length of the user data transmission layer protocol header, where the length of the user data protocol header is the length of the user data IP protocol header plus the length of the user data transmission layer protocol header.

A35. The data transmission device acquires the user data protocol header according to the transmission network IP packet data and the length of the user data protocol header, where the user data protocol header is data starting after the transmission tunneling protocol header in the transmission network IP packet data and corresponding to a length that is the length of the user data protocol header.

It should be noted that, in this embodiment of the present invention, after the data transmission device obtains the transmission network protocol header, the transmission tunneling protocol header, and the user data protocol header respectively by parsing in steps A1, A2, and A3, for step A4, in a possible implementation manner, that the data transmission device parses the received Internet Protocol IP data packet to obtain the user application layer data may specifically include the following steps:

The data transmission device acquires the user application layer data according to the transmission network IP packet data and the user data protocol header, where the user application layer data is corresponding data starting after the user data protocol header in the transmission network IP packet data until the end of the transmission network IP packet data.

After execution of step 101 is complete, in this embodiment of the present invention, the data transmission device may execute step 102. Step 102 is described in detail in the following.

102. The data transmission device compresses the transmission tunneling protocol header, the user data protocol header, and the user application layer data to obtain a compressed transmission network protocol payload.

In this embodiment of the present invention, the data transmission device obtains the transmission network protocol header, the transmission tunneling protocol header, the user data protocol header, and the user application layer data by parsing the protocol stack structure of the IP data packet, and then the data transmission device compresses the transmission tunneling protocol header, the user data protocol header, and the user application layer data to obtain the compressed transmission network protocol payload.

It should be noted that, in this embodiment of the present invention, that the data transmission device compresses the transmission tunneling protocol header, the user data protocol header, and the user application layer data to obtain the compressed transmission network protocol payload includes the following steps:

B1. The data transmission device performs header compression for the transmission tunneling protocol header and the user data protocol header to obtain a first result of header compression.

B2. The data transmission device compresses the user application layer data to obtain compressed user application layer data.

B3. The data transmission device encodes the first result of header compression and the compressed user application layer data to obtain the compressed transmission network protocol payload.

That is, in step B1, the data transmission device first performs header compression for the transmission tunneling protocol header and the user data protocol header, and then in step B2, the data transmission device compresses the user application layer data, and in step B3, the data transmission device encodes results of compression in B1 and B2 together to obtain the compressed transmission network protocol payload.

It should be noted that, in this embodiment of the present invention, after the compressed IP data packet is obtained in step 102, this embodiment of the present invention may further include the following step: The data transmission device determines whether a length of the compressed IP data packet is greater than a length of a maximum transmission unit of a lower layer protocol, and if the length of the compressed IP data packet is greater than the length of the maximum transmission unit of the lower layer protocol, the data transmission device performs IP fragmentation for the compressed IP data packet to obtain compressed IP data packet fragments. The lower layer protocol proposed in this embodiment of the present invention refers to a protocol that is directly used to transmit the compressed IP data packet. If the compressed IP data packet is fragmented, a subsequent step 104 in this embodiment of the present invention may be specifically: sending compressed IP data packet fragments to a core network or a base station.

103. The data transmission device uses the transmission network protocol header to encapsulate the compressed transmission network protocol payload to obtain a compressed IP data packet.

In this embodiment of the present invention, after the transmission network protocol header is acquired in step 101, herein, after the data transmission device acquires the compressed transmission network protocol payload, the data transmission device uses the transmission network protocol header to encapsulate the compressed transmission network protocol payload to obtain the compressed IP data packet.

104. The data transmission device sends the compressed IP data packet to a core network or a base station.

In this embodiment of the present invention described herein, specifically, the data transmission device may send the compressed IP data packet to a decoding device in the core network or in the base station. After acquiring the compressed IP data packet, the data transmission device, as an encoding device, sends the compressed IP data packet to the decoding device. Therefore, what the encoding device sends is the compressed IP data packet that has been compressed, and an amount of data on the transmission link may be reduced.

In the foregoing embodiment provided by the present invention, a received IP data packet is parsed to obtain a transmission network protocol header, a transmission tunneling protocol header, a user data protocol header, and user application layer data; then the transmission tunneling protocol header, the user data protocol header, and the user application layer data are compressed; and then the transmission network protocol header is used to encapsulate a compressed transmission network protocol payload to obtain a compressed IP data packet. In this optimization manner, compression of user application layer data may be implemented, and a compression rate of data transmitted on a Backhaul may be increased to increase throughput of the Backhaul.

Figure 2:
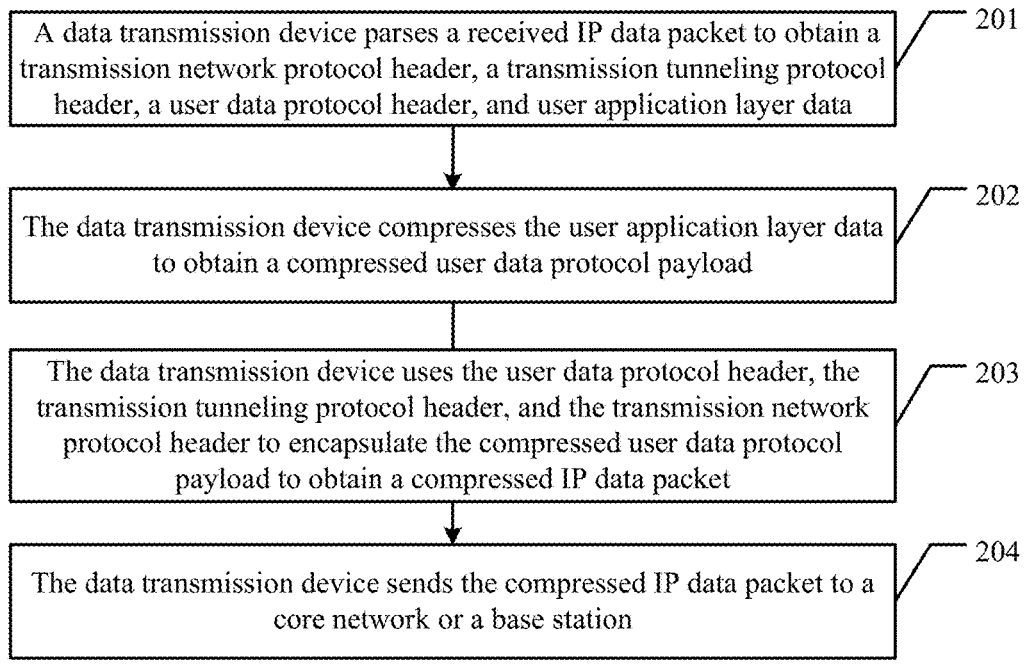
FIG. 2 is a schematic block flowchart of another data transmission method according to an embodiment of the present invention.

The foregoing embodiment introduces a data transmission method provided by the present invention. The following introduces another data transmission method provided by an embodiment of the present invention. As shown in FIG. 2, the method may mainly include the following steps:

201. A data transmission device parses a received IP data packet to obtain a transmission network protocol header, a transmission tunneling protocol header, a user data protocol header, and user application layer data.

Step 201 described herein is the same as step 101 described in the foregoing embodiment, and may also include steps A1, A2, A3, and A4, which are not described herein again. For the detailed description, refer to the description in the foregoing embodiment.

202. The data transmission device compresses the user application layer data to obtain a compressed user data protocol payload.

After the data transmission device acquires the user application layer data in step 201, the data transmission device compresses the user application layer data.

In the embodiments of the present invention, both step 102 and step 202 are to compress a result obtained after the IP data packet is parsed, to implement optimization of data transmission. Different from step 102, in step 202, the data transmission device compresses the user application layer data to obtain the compressed user data protocol payload, while in step 102, the transmission tunneling protocol header, the user data protocol header, and the user application layer data are compressed, and the compressed transmission network protocol payload is obtained.

By means of compression in step 202, compression of user application layer data can be implemented, and compression of data transmitted on a Backhaul may be implemented to increase throughput of the Backhaul.

It should be noted that, in this embodiment of the present invention, that the data transmission device compresses the user application layer data to obtain a compressed user data protocol payload, in an implementation manner, mainly includes the following steps:

C1. The data transmission device determines whether a user data transmission layer protocol is the Transmission Control Protocol (TCP, Transmission Control Protocol), and if the user data transmission layer protocol is TCP, the data transmission device acquires the user application layer data, where the user application layer data is a data payload (Payload) after TCP session reassembly.

C2. The data transmission device segments the user application layer data to obtain multiple user application layer data segments.

C3. The data transmission device generates a digital digest for each user application layer data segment obtained after segmentation.

C4. The data transmission device generates a codebook, where the codebook includes each digital digest and each user application layer data segment and an index structure of each digital digest and each user application layer data segment.

C5. The data transmission device sends the codebook to a decoding device that uses the codebook for decoding. In implementation, this step is optional.

C6. The data transmission device determines, according to the codebook, whether duplicate user application layer data segments exist in the multiple user application layer data segments.

C7. If duplicate user application layer data segments exist, the data transmission device uses digital digests corresponding to the duplicate user application layer data segments to replace the duplicate user application layer data segments.

C8. The data transmission device encodes non-duplicate user application layer data segments and the digital digests corresponding to the duplicate user application layer data segments to obtain the compressed user application layer data.

Step C1 may further include: if the user data transmission layer protocol is not TCP, acquiring the user application layer data, where the user application layer data is corresponding data starting after the user data protocol header in transmission network IP packet data until the end of the transmission network IP packet data.

In step C2, the data transmission device may obtain multiple user application layer data segments by segmenting the user application layer data. In step C3, a digital digest is generated for each user application layer data segment, where the digital digest may also be referred to as a fingerprint, and the digital digest includes all data information of the user application layer data segment. If digital digests corresponding to two user application layer data segments are the same, the two user application layer data segments are also completely the same. In step C4, the codebook generated by the data transmission device includes each digital digest and each user application layer data segment and an index structure of each digital digest and each user application layer data segment, where the index structure is a one-to-one mapping relationship between a digital digest and a user application layer data segment. In step C5, the data transmission device synchronizes the generated codebook to another data transmission device (also referred to as a decoding device) at the other end of a transmission link, so that codebooks of the two data transmission devices at two ends of the transmission link remain the same. After the data transmission device performs data de-duplication, the another data transmission device performs data restoration. In step C6, the data transmission device determines, according to the index structure, whether duplicate user application layer data segments exist. If duplicate user application layer data segments exist, in step C7, the digital digests corresponding to the duplicate user application layer data segments are used to replace the duplicate user application layer data segments. In step C8, the non-duplicate user application layer data segments and the digital digests corresponding to the duplicate user application layer data segments are encoded to obtain a compressed IP data packet, where the digital digests corresponding to the duplicate user application layer data segments are completely the same, and the non-duplicate user application layer data segments are user application layer data segments corresponding to different digital digests.

203. The data transmission device uses the user data protocol header, the transmission tunneling protocol header, and the transmission network protocol header to encapsulate the compressed user data protocol payload to obtain a compressed IP data packet.

In this embodiment of the present invention, after the user data protocol header, the transmission tunneling protocol header, and the transmission network protocol header are acquired in step 201, herein, after the data transmission device acquires the compressed user data protocol payload, the data transmission device uses the user data protocol header, the transmission tunneling protocol header, and the transmission network protocol header to encapsulate the compressed user data protocol payload to obtain the compressed IP data packet.

204. The data transmission device sends the compressed IP data packet to a core network or a base station.

In this embodiment of the present invention described herein, specifically, the data transmission device may send the compressed IP data packet to a decoding device in the core network or in the base station. After acquiring the compressed IP data packet, the data transmission device, as an encoding device, sends the compressed IP data packet to the decoding device. Therefore, what the encoding device sends is the compressed IP data packet that has been compressed, and an amount of data on the transmission link may be reduced.

In the foregoing embodiment provided by the present invention, a received IP data packet is parsed to obtain a transmission network protocol header, a transmission tunneling protocol header, a user data protocol header, and user application layer data; then the user application layer data is compressed; and then the user data protocol header, the transmission tunneling protocol header, and the transmission network protocol header are used to encapsulate a compressed user data protocol payload to obtain a compressed IP data packet. In this optimization manner, compression of user application layer data may be implemented, and a compression rate of data transmitted on a Backhaul may be increased to increase throughput of the Backhaul.

Figure 3:
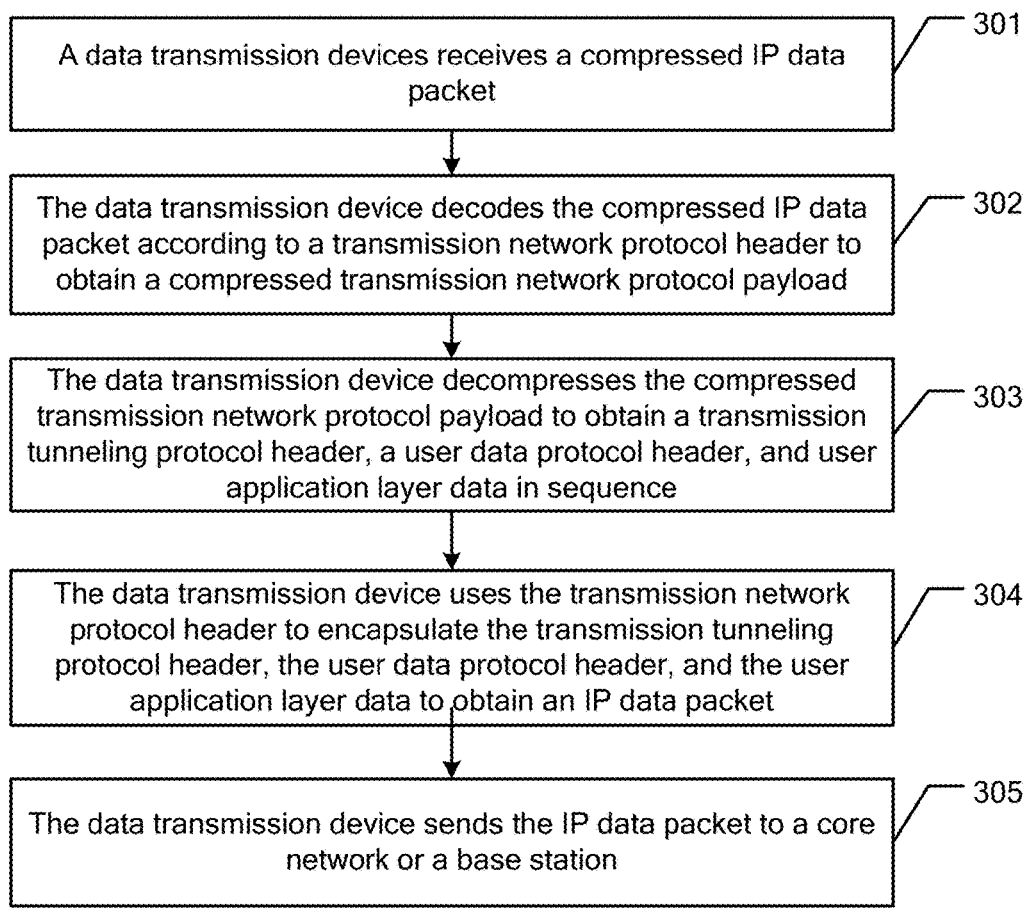
FIG. 3 is a schematic block flowchart of another data transmission method according to an embodiment of the present invention.

The foregoing embodiment introduces a data transmission device located at one end of a backhaul link and configured to implement de-duplication of transmitted data during a complete data transmission process. The following introduces a data transmission device located at the other end of the backhaul link and configured to implement restoration of the transmitted data. Referring to FIG. 3, an embodiment of the present invention provides a data transmission method. The data restoration method shown in FIG. 3 is corresponding to the data compression method shown in FIG. 1. As shown in FIG. 3, the method may specifically include:

301. A data transmission device receives a compressed IP data packet.

In this embodiment of the present invention, the data transmission device described herein and the data transmission device introduced in the foregoing embodiment are located on a same transmission link. When a data transmission device at one end of a same transmission link sends a compressed IP data packet, a data transmission device at the other end of the transmission link first needs to receive the compressed IP data packet, that is, after the data transmission device at one end of the transmission link implements data de-duplication, the data transmission device at the other end of the transmission link receives the compressed IP data packet and needs to perform data restoration. For a specific process of implementing data restoration, refer to subsequent descriptions.

It should be noted that, the data transmission device receives the compressed IP data packet, and the data transmission device executes step 302 to step 305. In this embodiment, a restoration method corresponding to the de-duplication method needs to be executed when restoration is performed.

302. The data transmission device decodes the compressed IP data packet according to a transmission network protocol header to obtain a compressed transmission network protocol payload.

In this embodiment of the present invention, the data transmission device may obtain the compressed transmission network protocol payload by decoding the compressed IP data packet according to the transmission network protocol header. It should be noted that, the decoding process described herein is reverse to the compression process introduced in the foregoing embodiment. Two data transmission devices deployed at two ends of a same transmission link know how the peer data transmission device processes data, that is, how the data transmission device at one end of the same transmission link compresses data. Correspondingly, the peer data transmission device needs to decompress data by reverse means.

It should be noted that, optionally, the transmission network protocol header includes a transmission network IP protocol header and a transmission network transmission layer protocol header. A transmission tunneling protocol header includes a GTP-U protocol header. A user data protocol header includes a user data IP protocol header carried by a transmission tunneling protocol and a user data transmission layer protocol header. User application layer data includes a payload Payload of a user data transmission layer protocol.

It should be noted that, in this embodiment of the present invention, that the data transmission device decodes the compressed IP data packet according to a transmission network protocol header to obtain a compressed transmission network protocol payload in step 302 may include the following steps:

D1. The data transmission device parses the compressed IP data packet to acquire a length of the transmission network IP protocol header and a corresponding field.

D2. The data transmission device acquires a length of the transmission network transmission layer protocol header according to the length of the transmission network IP protocol header and the corresponding field.

D3. The data transmission device acquires a length of the transmission network protocol header according to the length of the transmission network IP protocol header and the length of the transmission network transmission layer protocol header, where the length of the transmission network protocol header is the length of the transmission network IP protocol header plus the length of the transmission network transmission layer protocol header.

D4. The data transmission device removes data from a beginning of the compressed IP data packet and corresponding to the length of the transmission network protocol header, to obtain the compressed transmission network protocol payload.

It should be noted that, for the compressed IP data packet in step D4, the data from the beginning of the compressed IP data packet and corresponding to the length of the transmission network protocol header is removed, and remaining data in the compressed IP data packet may be referred to as the compressed transmission network protocol payload.

303. The data transmission device decompresses the compressed transmission network protocol payload to obtain a transmission tunneling protocol header, a user data protocol header, and user application layer data in sequence.

In this embodiment of the present invention, in step 302, the data transmission device decodes the compressed IP data packet according to the transmission network protocol header to obtain the compressed transmission network protocol payload, and then decompresses the compressed transmission network protocol payload to obtain the transmission tunneling protocol header, the user data protocol header, and the user application layer data in sequence.

It should be noted that, in this embodiment of the present invention, that the data transmission device decompresses the compressed transmission network protocol payload to obtain the transmission tunneling protocol header, the user data protocol header, and the user application layer data in sequence may include the following steps:

E1. The data transmission device performs header decompression for the compressed transmission network protocol payload according to the transmission tunneling protocol header and the user data protocol header in sequence to obtain a decompressed transmission tunneling protocol header, a decompressed user data protocol header, and compressed user application layer data.

E2. The data transmission device decompresses the compressed user application layer data to obtain the user application layer data.

That is, in step E1, after header decompression is performed for the compressed transmission network protocol payload, the compressed user application layer data is obtained, and then step E2 is executed: the compressed user application layer data is decompressed to obtain the user application layer data.

It should be noted that, that the data transmission device decompresses the compressed user application layer data to obtain the user application layer data may specifically include the following steps:

F1. The data transmission device receives a codebook sent by an encoding device, where the codebook includes each digital digest and each user application layer data segment and an index structure of each digital digest and each user application layer data segment.

F2. The data transmission device determines, according to the codebook, whether duplicate user application layer data segments exist in the compressed user application layer data.

F3. If duplicate user application layer data segments exist, the data transmission device decodes the compressed user application layer data to obtain non-duplicate user application layer data segments and digital digests corresponding to the duplicate user application layer data segments, and then executes step F4.

F4. The data transmission device restores the digital digests corresponding to the duplicate user application layer data segments that are obtained by decoding, to the duplicate user application layer data segments.

F5. The data transmission device assembles the duplicate user application layer data segments and the non-duplicate user application layer data segments to obtain the user application layer data.

It should be noted that, in step F1, the data transmission device receives the codebook from another data transmission device (also referred to as an encoding device) that belongs to the same transmission link as the data transmission device. Synchronization of codebooks is maintained in the data transmission devices at the two ends of the same transmission link, and the another data transmission device de-duplicates transmitted data according to the codebook. Herein the data transmission device restores the transmitted data according to the codebook. In step F2, the data transmission device may determine, according to the codebook, whether any digital digest exists in the compressed user application layer data; if a digital digest exists in the compressed IP data packet, it may indicate that duplicate user application layer data segments exist in the compressed IP data packet; if no digital digest exists in the compressed IP data packet, it indicates that no duplicate user application layer data segment exists in the compressed IP data packet.

In step F4, the data transmission device restores, according to the codebook, the digital digests that exist in the compressed IP data packet to the user application layer data segments corresponding to the digital digests. Therefore, the data transmission device restores the compressed IP data packet to two parts: 1. the user application layer data segments restored according to the digital digests (that is, the duplicate user application layer data segments); 2. the user application layer data segments that are not restored (that is, the non-duplicate user application layer data segments).

In step F5, the data transmission device assembles the duplicate user application layer data segments and the non-duplicate user application layer data segments to obtain the user application layer data. Because the user application layer data is segmented in the foregoing embodiment, herein the user application layer data segments need to be reassembled to obtain the user application layer data.

304. The data transmission device uses the transmission network protocol header to encapsulate the transmission tunneling protocol header, the user data protocol header, and the user application layer data to obtain an IP data packet.

In this embodiment of the present invention, by executing step 303 to decompress the compressed transmission network protocol payload, the transmission tunneling protocol header, the user data protocol header, and the user application layer data are obtained in sequence, and then by executing step 304 to use the transmission network protocol header to encapsulate the transmission tunneling protocol header, the user data protocol header, and the user application layer data, the IP data packet may be obtained.

In the description of steps 302 to 304, the data transmission device implements restoration of the compressed IP data packet and obtains the IP data packet.

305. The data transmission device sends the IP data packet to a core network or a base station.

In this embodiment of the present invention, after receiving, through the transmission link, the compressed IP data packet sent by the encoding device, the data transmission device, which is used as a decoding device, restores the compressed IP data packet by executing steps 302 to 304, to obtain the IP data packet, and then sends the IP data packet to the core network or the base station.

In this embodiment provided by the present invention, after receiving a compressed IP data packet, a data transmission device decodes the compressed IP data packet according to a transmission network protocol header to obtain a compressed transmission network protocol payload; then decompresses the compressed transmission network protocol payload to obtain a transmission tunneling protocol header, a user data protocol header, and user application layer data; and finally uses the transmission network protocol header to encapsulate the transmission tunneling protocol header, the user data protocol header, and the user application layer data to obtain an IP data packet. In this implementation manner, restoration of a compressed IP data packet is implemented to obtain an IP data packet, and restoration of a compressed data packet transmitted on a transmission link is implemented, and therefore throughput of a Backhaul may be increased.

Figure 4:
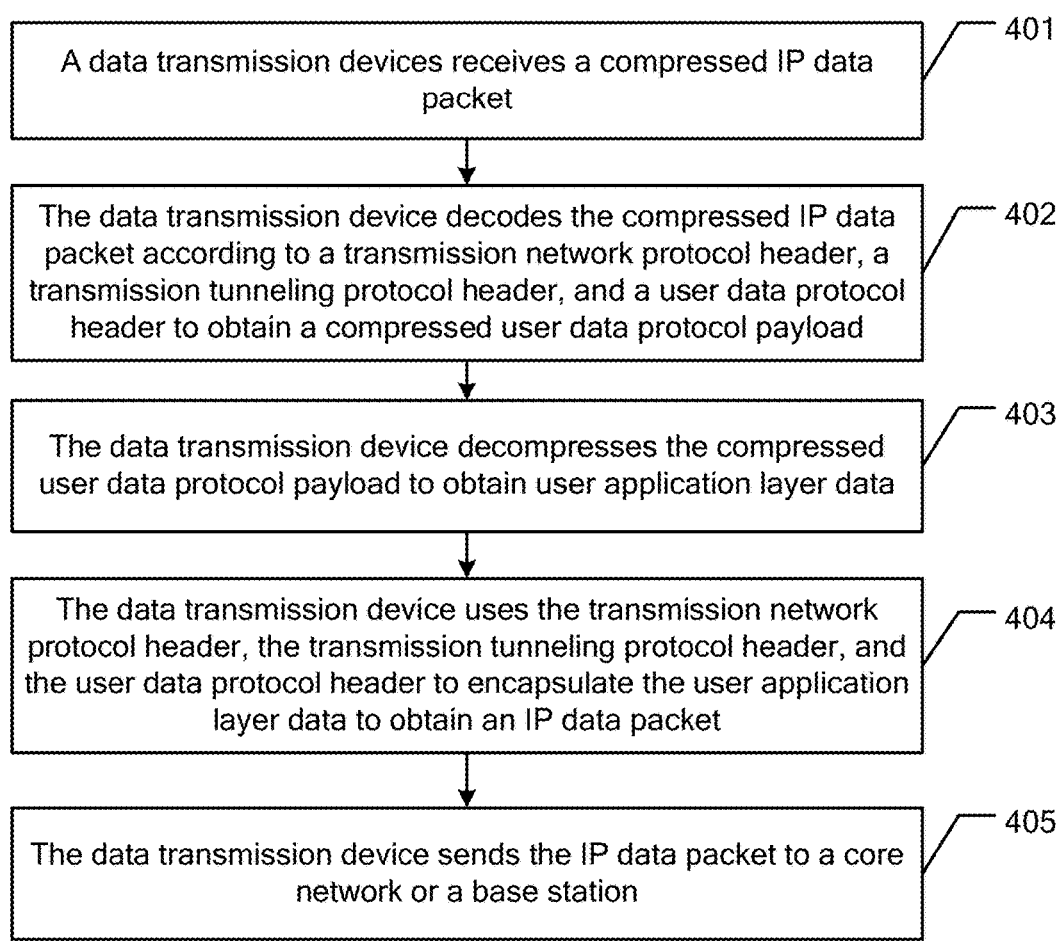
FIG. 4 is a schematic block flowchart of another data transmission method according to an embodiment of the present invention.

The foregoing embodiment introduces a data transmission device located at the other end of a backhaul link and configured to implement restoration of transmitted data. Referring to FIG. 4, an embodiment of the present invention provides another data transmission method. The data restoration method shown in FIG. 4 is corresponding to the data compression method shown in FIG. 2. As shown in FIG. 4, the method may specifically include:

401. A data transmission device receives a compressed IP data packet.

402. The data transmission device decodes the compressed IP data packet according to a transmission network protocol header, a transmission tunneling protocol header, and a user data protocol header to obtain a compressed user data protocol payload.

In this embodiment of the present invention, the data transmission device may obtain the compressed user data protocol payload by decoding the compressed IP data packet according to the transmission network protocol header, the transmission tunneling protocol header, and the user data protocol header. It should be noted that, the decoding process described herein is reverse to the compression process introduced in the foregoing embodiment. Two data transmission devices deployed at two ends of a same transmission link know how the peer data transmission device processes data, that is, how the data transmission device at one end of the same transmission link compresses data. Correspondingly, the peer data transmission device needs to decompress data by reverse means.

It should be noted that, optionally, the transmission network protocol header includes a transmission network IP protocol header and a transmission network transmission layer protocol header. The transmission tunneling protocol header includes a GTP-U protocol header. The user data protocol header includes a user data IP protocol header carried by a transmission tunneling protocol and a user data transmission layer protocol header. User application layer data includes a payload Payload of a user data transmission layer protocol.

403. The data transmission device decompresses the compressed user data protocol payload to obtain user application layer data.

It should be noted that, that the data transmission device decompresses the compressed user data protocol payload to obtain user application layer data may specifically include the following steps:

G1. The data transmission device receives a codebook sent by an encoding device, where the codebook includes each digital digest and each user application layer data segment and an index structure of each digital digest and each user application layer data segment.

G2. The data transmission device determines, according to the codebook, whether duplicate user application layer data segments exist in the compressed user data protocol payload.

G3. If duplicate user application layer data segments exist, the data transmission device decodes the compressed user data protocol payload to obtain non-duplicate user application layer data segments and digital digests corresponding to the duplicate user application layer data segments, and then executes step G4.

G4. The data transmission device restores the digital digests corresponding to the duplicate user application layer data segments that are obtained by decoding, to the duplicate user application layer data segments.

G5. The data transmission device assembles the duplicate user application layer data segments and the non-duplicate user application layer data segments to obtain the user application layer data.

404. The data transmission device uses the transmission network protocol header, the transmission tunneling protocol header, and the user data protocol header to encapsulate the user application layer data to obtain an IP data packet.

It should be noted that, that the data transmission device encapsulates the user application layer data by using the transmission network protocol header, the transmission tunneling protocol header, and the user data protocol header in sequence in step 404 is reverse to the decoding process in step 402.

405. The data transmission device sends the IP data packet to a core network or a base station.

After the data transmission device restores the received compressed IP data packet to the IP data packet, the data transmission device sends the IP data packet to the core network or the base station. In the embodiment shown in FIG. 2, if the compressed IP data packet is sent to a decoding device in the core network in step 204, herein the data transmission device sends the IP data packet to the core network; if the compressed IP data packet is sent to a decoding device in the base station in step 204, herein the data transmission device sends the IP data packet to the base station.

In this embodiment of the present invention, if a data transmission device receives a compressed IP data packet, the data transmission device first decodes the compressed IP data packet according to a transmission network protocol header, a transmission tunneling protocol header, and a user data protocol header to obtain a compressed user data protocol payload. It should be noted that, the decoding process described herein is reverse to the encoding process introduced in the foregoing embodiment, and the decapsulation process is also reverse to the encapsulation process introduced in the foregoing embodiment. Two data transmission devices deployed at two ends of a same transmission link know how the peer data transmission device processes data, that is, how the data transmission device at one end of the same transmission link compresses data. Correspondingly, the peer data transmission device needs to decompress data by reverse means.

It should be noted that, in the embodiment of the present invention shown in FIG. 2, the data transmission device compresses the IP data packet, then transmits the compressed IP data packet on the transmission link, and sends the compressed IP data packet to another data transmission device in the embodiment of the present invention shown in FIG. 4, and the another data transmission device performs restoration. The entire process passes through a complete process of "compressing data-transmitting data-restoring data".

In this embodiment provided by the present invention, after receiving a compressed data packet, a data transmission device decodes the compressed IP data packet according to a transmission network protocol header, a transmission tunneling protocol header, and a user data protocol header to obtain a compressed user data protocol payload; then decompresses the compressed user data protocol payload to obtain user application layer data; and then encapsulates the user application layer data according to the user data protocol header, the transmission tunneling protocol header, and the transmission network protocol header in sequence to obtain an IP data packet. In this implementation manner, restoration of a compressed IP data packet is implemented to obtain an IP data packet, and restoration of a compressed data packet transmitted on a transmission link is implemented, and therefore throughput of a Backhaul may be increased.

With respect to the foregoing embodiments shown in FIG. 1 and FIG. 3, and FIG. 2 and FIG. 4, the following uses an actual application scenario for detailed description. A complete process of transmitting data on a Backhaul is described in the following with reference to FIG. 5, which is a schematic diagram of data interaction between a first data transmission device and a second data transmission device. It should be noted that, the first data transmission device may be specifically the data transmission device described in the embodiment shown in FIG. 1, and the second data transmission device may be specifically the data transmission device described in the embodiment shown in FIG. 3. Herein first and second are used to distinguish the two data transmission devices deployed at two ends of the Backhaul described in FIG. 1 and FIG. 3. The device deployed at one end of the Backhaul is the first data transmission device, and the device deployed at the other end of the Backhaul is the second data transmission device. The first data transmission device is configured to implement compression of data, and the second data transmission device is configured to implement restoration of the data. The first data transmission device may also be specifically the data transmission device described in the embodiment shown in FIG. 2, and the second data transmission device may also be specifically the data transmission device described in the embodiment shown in FIG. 4, which are only for description.

The first data transmission device first performs IP parsing for an IP data packet received by a serving General Packet Radio Service technology support node (SGSN, Serving GPRS Support Node), a gateway General Packet Radio Service technology support node (GGSN, Gateway GPRS Support Node), or a serving gateway (S-GW, Serving Gate-Way) to obtain a transmission network protocol header, a transmission tunneling protocol header, a user data protocol header, and user application layer data.

The transmission network protocol header includes a transmission network IP protocol header and a transmission network transmission layer protocol header; the transmission tunneling protocol header is specifically a General Packet Radio Service technology Tunneling Protocol User plane GTP-U protocol header; the user data protocol header includes a user data IP protocol header carried by a transmission tunneling protocol and a user data transmission layer protocol header; the user application layer data is specifically a payload Payload of a user data transmission layer protocol.

In this embodiment of the present invention, the first data transmission device uses the transmission tunneling protocol header, the user data protocol header, and the user application layer data as optimized objects. The first data transmission device compresses the transmission tunneling protocol header, the user data protocol header, and the user application layer data, and then performs encapsulation by using the transmission network protocol header, to obtain a compressed IP data packet. A protocol type of the transmission network transmission layer protocol is UDP; a protocol type of the transmission tunneling protocol is GTP-U; and a protocol type of the transmission network IP protocol is IP. The first data transmission device parses the received Internet Protocol IP data packet to obtain the transmission network protocol header, the transmission tunneling protocol header, the user data protocol header, and the user application layer data. An algorithm may include the following steps:

When receiving an IP data packet in which IP fragments exist, the first data transmission device performs IP fragment reassembly for the IP data packet in which IP fragments exist, to acquire complete transmission network IP packet data.

The first data transmission device acquires a transmission network IP protocol header from the transmission network IP packet data, where the transmission network IP protocol includes physical layer data and data link layer data, and then acquires the protocol type UDP of the transmission network transmission layer protocol according to the transmission network IP packet data, and executes the following algorithm:

1. Initialization: Define that a pointer ptr points to a transmission network transmission layer protocol header UDP Payload, and define a length of the protocol header len=0.

2. Parse a GTP-U header.

(2.1) Define a length of the GTP-U header gtp_hlen=0.

(2.2) GTP-U includes an 8-byte fixed header: gtp_hlen+=8.

(2.3) Determine, according to a flag bit E, S, or PN in a format of the GTP-U header, whether any optional field exists, and if the flag bit E, S, or PN is 1, it indicates that a 4-byte optional field exists: gtp_hlen+=4.

(2.4) If an optional field exists, determine, according to the E flag bit and a Next Extension Header Type field, whether any extension header exists, and if an extension header exists, execute step 2.5, or if no extension header exists, skip to step 3.

(2.5) Perform parsing according to the Extension Header Length field in the extension header: gtp_hlen+=(Extension Header Length*4), read a Next Extension Header Type field at (ptr+len−1), and if the field is not 0, execute step 2.4 cyclically until a Next Extension Header Type field is 0. In this case, the length of the GTP-U header gtp_hlen is obtained.

(2.6) len+=gtp_hlen.

3. Obtain complete user data IP packet data after performing IP fragment assembly for the IP data packet carried by GTP-U, and parse a header of the user data IP packet data according to a Header Length field of the header of the user data IP packet data: len+=(Header Length*4).

According to a protocol type in a user data IP protocol header carried by GTP-U, if a user data transmission layer protocol is TCP, a TCP header is parsed according to a Data Offset field: len+=(Data Offset*4); if the user data transmission layer protocol is UDP, fixed 8 bytes are parsed: len+=8.

Data starting from the pointer ptr and having a length of len is used as a header block, where the header block includes a transmission network protocol header, a transmission tunneling protocol header, and a user data protocol header, that is, a part starting from the pointer (ptr+len) is a payload (Payload) of the user data transmission layer protocol.

After the first data transmission device acquires the user application layer data, two processing manners are included: (1) and (2), which are described in detail.

Figure 5:
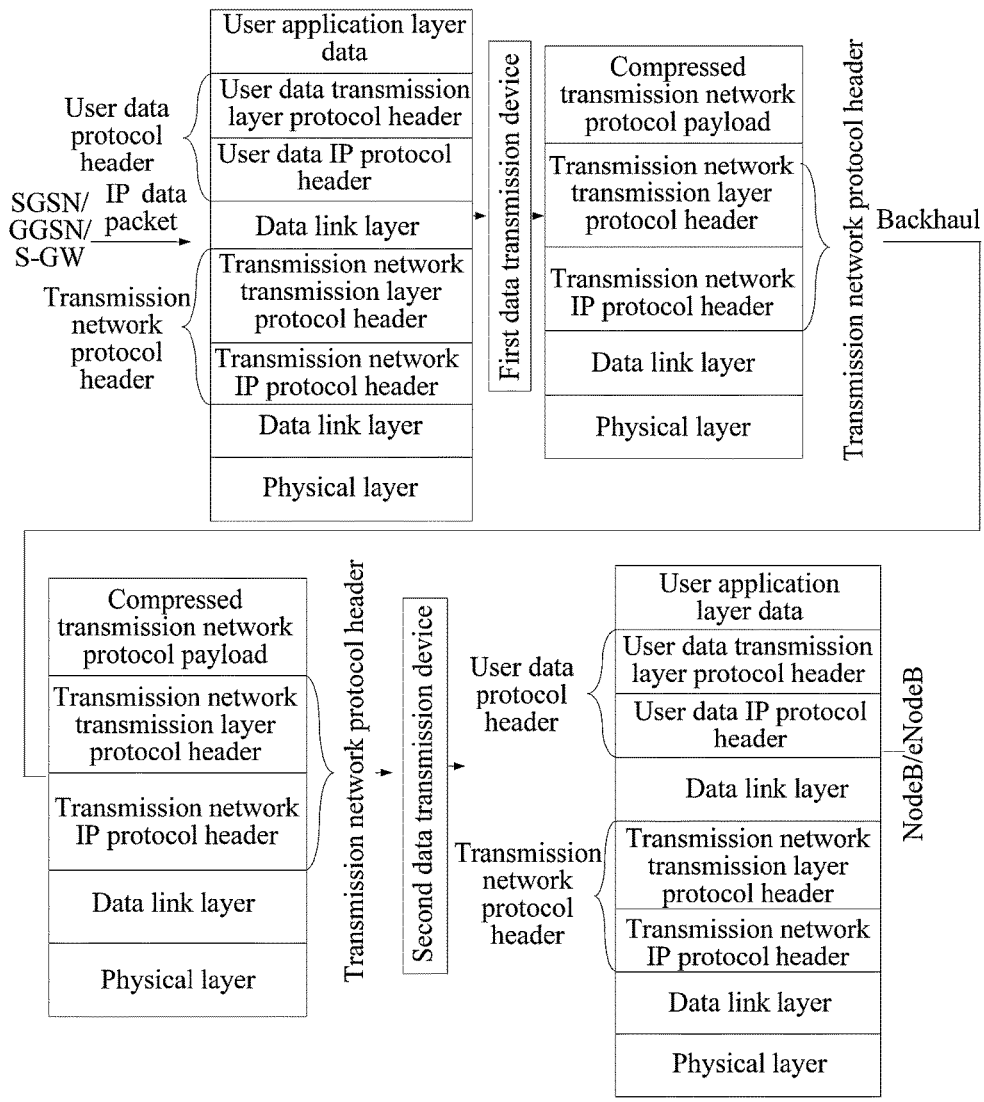
FIG. 5 is a schematic diagram of interaction between a first data transmission device and a second data transmission device according to an embodiment of the present invention.

(1) The first data transmission device may compress the transmission tunneling protocol header, the user data protocol header, and the user application layer data to obtain a compressed transmission network protocol payload shown in FIG. 5, and then use the transmission network protocol header to encapsulate the compressed transmission network protocol payload to obtain a compressed IP data packet, and an implementation algorithm includes the following steps:

1. The first data transmission device performs header compression for the transmission tunneling protocol header and the user data protocol header to obtain a result of header compression.

2. Segment the user application layer data to obtain N (N is a natural number) user application layer data segments, which are Data1, Data2, . . . , and DataN.

3. Generate a digital digest for each user application layer data segment, that is, generate a digital digest Fingerprint1 for Data1, generate a digital digest Fingerprint2 for Data2, . . . , and generate a digital digest FingerprintN for DataN.

4. Generate a codebook, where the codebook records Data1, Data2, . . . , DataN, Fingerprint1, Fingerprint2, . . . , FingerprintN, and an index structure of Data1, Data2, . . . , DataN, and Fingerprint1, Fingerprint2, . . . , FingerprintN.

5. Synchronously send the codebook to the second data transmission device, so that the second data transmission device uses the codebook when restoring the data.

6. Determine, according to the index structure of the digital digests and the user application layer data segments, whether duplicate user application layer data segments exist in Data1, Data2, . . . , and DataN, and assuming that Data1 and Data2 are duplicate, use Fingerprint1 to replace Data1 and Data2.

7. Encode Fingerprint1 and Data3, . . . , and DataN (that is, non-duplicate user application layer data segments) to obtain compressed user application layer data.

Figure 6:
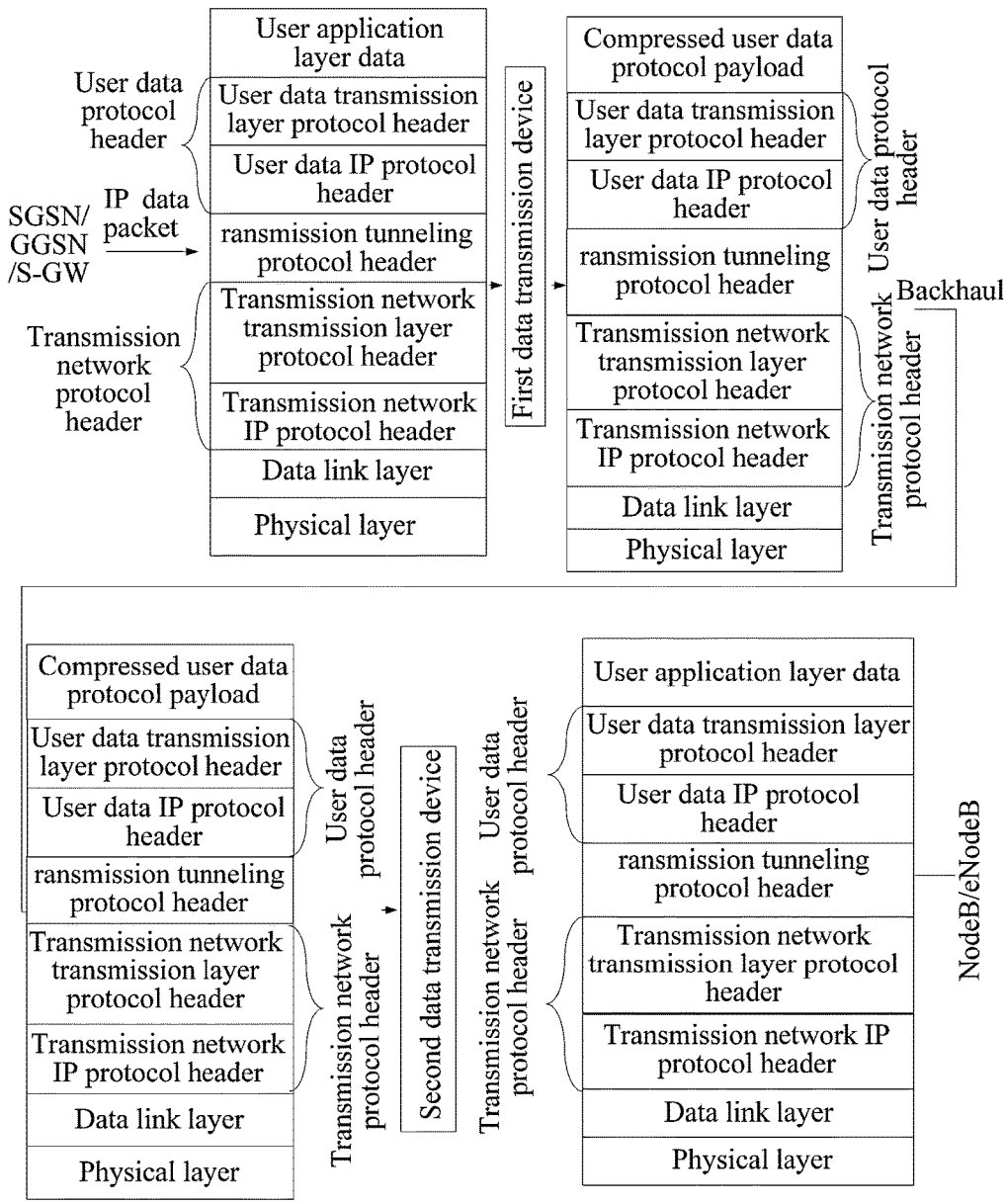
FIG. 6 is another schematic diagram of interaction between a first data transmission device and a second data transmission device according to an embodiment of the present invention.

(2) The first data transmission device compresses the user application layer data to obtain a compressed user data protocol payload shown in FIG. 6, and then uses the user data protocol header, the transmission tunneling protocol header, and the transmission network protocol header to encapsulate the compressed user data protocol payload to obtain a compressed IP data packet. The first data transmission device compresses the user application layer data, and an implementation algorithm includes the following steps:

First, maintain a table in which each row includes the following fields:
transmission network IP protocol header;
transmission network transmission layer protocol header;
GTP-U protocol header and its length; and
source IP address, destination IP address, and IP identifier of a user application layer.

Second, an implementation algorithm includes the following steps:

1. Initialization:

(1) Perform IP fragment reassembly each time an IP data packet is input.

(2) Add a row in the table.

(3) Define that a pointer ptr points to the transmission network IP protocol header of a transmission network layer.

2. Save the transmission network IP protocol header to the "transmission network IP protocol header" field in the table according to the Header Length field of the transmission network IP protocol header; if the protocol type of the transmission network transmission layer protocol is UDP, shift back the pointer ptr by (Header Length*4) bytes, and execute a next step.

3. Save an 8-byte UDP data header to the "transmission network transmission layer protocol header" field in the table; if a source port number or a destination port number of UDP is 2132, shift back the pointer ptr by 8 bytes, and execute a next step.

4. Parse the GTP-U protocol header, and obtain a length gtp_hlen of the GTP-U header (a calculation manner is described in the foregoing embodiment); save the GTP-U header to the "GTP-U protocol header and its length" field in the table; shift back the pointer ptr by gtp_hlen bytes.

5. In this case, the pointer ptr already points to the header of the IP packet data of the user application layer. Read a source IP address, a destination IP address, and an IP identifier of the user application layer, and save them to the "source IP address, destination IP address, and IP identifier of a user application layer" field in the table.

6. A part from the pointer ptr to the end of data is the user application layer data. Compress the user application layer data to obtain the compressed user data protocol payload (its implementation manner is similar to the foregoing manner of compressing the user application layer data).

7. Point the pointer ptr to the compressed user data protocol load, read the source IP address, the destination IP address, and the IP identifier of the user application layer, search for the "source IP address, destination IP address, and IP identifier" field in the table to obtain the GTP-U protocol header of the transmission network layer, the transmission network transmission layer protocol header, and the transmission network IP protocol header. The first data transmission device uses the user data protocol header, the transmission tunneling protocol header, and the transmission network protocol header to encapsulate the compressed user data protocol payload to obtain a compressed IP data packet, which specifically includes the following three steps:

a. Add the GTP-U protocol header, and re-calculate a Total Length field.

b. Add the transmission network transmission layer protocol header, and re-calculate the Length field and Checksum.

c. Add the transmission network IP protocol header field, and re-calculate the Total Length and Header Checksum fields.

The compressed IP data packet may be obtained after the GTP-U protocol header, the transmission network transmission layer protocol header, and the transmission network IP protocol header field are added to the compressed user data protocol payload.

8. Clear entries that are already re-encapsulated.

An implementation manner of the second data transmission device is just reverse to the process of the first data transmission device, and is not described herein again.

The foregoing embodiment introduces a data transmission method provided by the present invention. The following introduces another data transmission method provided by an embodiment of the present invention. During a complete data transmission process, a data transmission device at one end of a backhaul link is configured to implement de-duplication of transmitted data, and a data transmission device at the other end of the backhaul link is configured to implement restoration of the transmitted data. The two data transmission devices are deployed at the two ends of the entire backhaul link, and are configured to implement compression of the data transmitted on the backhaul link to increase throughput of the Backhaul. The following describes how a data transmission device configured to implement data de-duplication and a data transmission device configured to implement data restoration during a complete data transmission process specifically implement the present invention separately. Data de-duplication and data restoration are later described separately by using independent embodiments.

Figure 7:
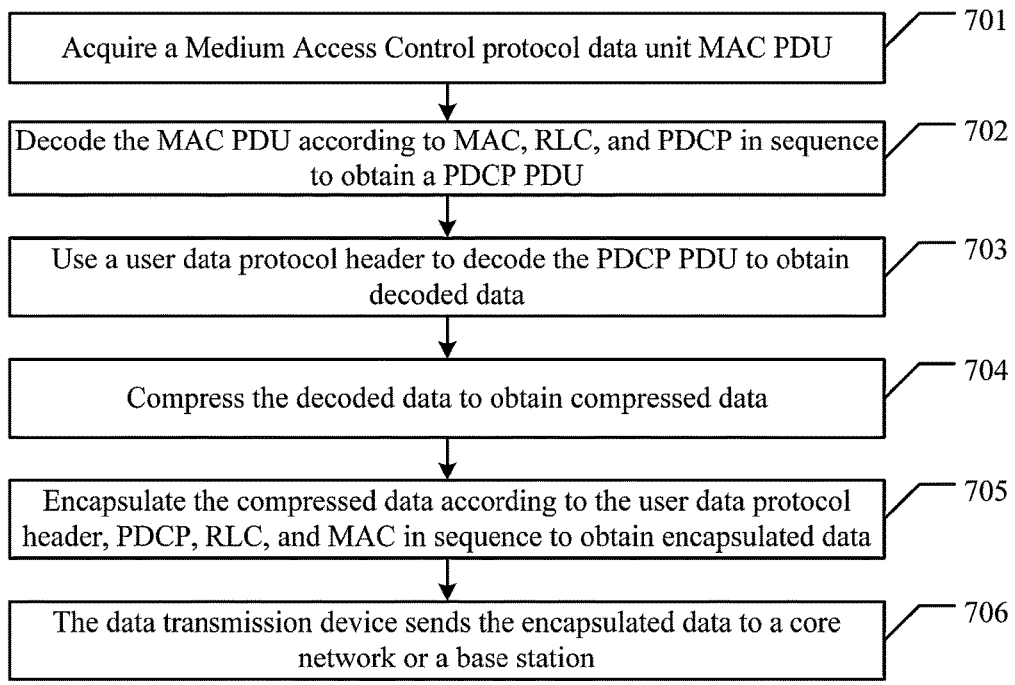
FIG. 7 is a schematic block flowchart of another data transmission method according to an embodiment of the present invention.

Referring to FIG. 7, a data transmission method provided by an embodiment of the present invention includes:

701. Acquire a Medium Access Control protocol data unit MAC PDU.

In this embodiment of the present invention, a specific manner may be that a data transmission device acquires a Uu interface Medium Access Control protocol data unit (MAC PDU, Medium Access Control Protocol Data Unit) that is obtained by decoding according to an Iub interface protocol, and a data transmission device configured to implement data de-duplication is deployed at one end of a transmission link. The data transmission device first acquires a Uu interface MAC PDU, where the Uu interface MAC PDU is data that is obtained by decoding according to a protocol that is used to connect an Iub interface, where the protocol used to connect an Iub interface may be specifically IP, UDP, the Frame Protocol (FP, Frame Protocol), or the like.

It should be noted that, in this embodiment of the present invention, for step 701, that a data transmission device acquires a MAC PDU that is obtained by decoding according to an Iub interface protocol, in a possible implementation manner, may specifically include:

H1. The data transmission device decodes the received Iub encapsulated data according to the Iub interface protocol to obtain the MAC PDU;

or

H2. The data transmission device receives the MAC PDU from a protocol processing module of a base station or a protocol processing module of a radio network controller (RNC, Radio Network Controller).

It should be noted that, in step H2, if the data transmission device receives the MAC PDU from the protocol processing module of the base station, the data transmission device is deployed in the base station, and may be deployed between an Iub interface protocol processing module and a Uu interface protocol processing module that are in the base station. Because the base station already decodes data according to the Iub interface protocol, the data transmission device may directly receive the MAC PDU from the base station. If the data transmission device receives the MAC PDU from the radio network controller, the data transmission device is connected to the radio network controller, and the data transmission device may receive the MAC PDU from the protocol processing module of the radio network controller.

In this embodiment of the present invention, it should be noted that, the Iub encapsulated data is data obtained by decoding according to the Iub interface protocol. For step H1, that the data transmission device decodes the received Iub encapsulated data according to the Iub interface protocol to obtain the MAC PDU, in a possible implementation manner, may specifically include:

I1. When the Iub encapsulated data is an IP data packet in which IP fragments exists, the data transmission device performs IP fragment assembly for the IP data packet to obtain complete transmission network IP packet data.

I2. The data transmission device decodes the transmission network IP packet data according to the Internet Protocol (IP, Internet Protocol) and the User Datagram Protocol (UDP, User Datagram Protocol) to obtain a UDP payload.

I3. The data transmission device decodes the UDP payload according to the Frame Protocol (FP, Frame Protocol) to obtain the MAC PDU.

It should be noted that, in this embodiment of the present invention, in step 701, the data transmission device acquires the MAC PDU that is obtained by decoding according to the Iub interface protocol. For details about the processing of the MAC PDU provided by this embodiment of the present invention, refer to the description in the following steps 702 to 704.

702. Decode the MAC PDU according to the Medium Access Control Protocol MAC, the Radio Link Control Protocol RLC, and the Packet Data Convergence Protocol PDCP in sequence to obtain a Packet Data Convergence Protocol protocol data unit PDCP PDU.

The data transmission device decodes the MAC PDU according to the MAC, the Radio Link Control Protocol RLC, and the Packet Data Convergence Protocol PDCP in sequence to obtain the Packet Data Convergence Protocol protocol data unit (PDCP PDU, Packet Data Convergence Protocol Protocol Data Unit).

After acquiring the MAC PDU, the data transmission device decodes the MAC PDU according to a Uu interface protocol to obtain the PDCP PDU. It should be noted that, in this embodiment of the present invention, that the data transmission device decodes the MAC PDU according to MAC, RLC, and PDCP in sequence to obtain the PDCP PDU, may specifically include the following steps:

J1. The data transmission device decodes the MAC PDU at a MAC layer to obtain an RLC PDU.

J2. The data transmission device decodes the RLC PDU at an RLC layer, and then performs PDCP decoding and reassembly for the decoded RLC PDU to obtain the PDCP PDU.

The RLC PDU is data obtained by decoding the MAC PDU according to the MAC protocol, and the PDCP PDU is data obtained by decoding and reassembling the RLC PDU according to the RLC protocol.

In step J1, the data transmission device decodes the MAC PDU according to a protocol stack structure of the MAC protocol to obtain the RLC PDU, and in step J2, a result is also obtained by decoding according to a protocol stack structure of a respective protocol.

It should be noted that, if data carried by the MAC PDU is encrypted, the data transmission device decodes the MAC PDU at the MAC layer, decrypts the data carried by the MAC PDU, and then executes step J2. If data carried by the RLC PDU is encrypted, the data transmission device decodes the RLC PDU at the RLC layer and decrypts the data carried by the RLC PDU. The data transmission device executes step 703 after decrypting RLC decoded data.

703. Use a user data protocol header to decode the PDCP PDU to obtain decoded data.

Specifically, the data transmission device may use the user data protocol header to decode the PDCP PDU to obtain Uu decoded data.

The user data protocol header may specifically include a user data IP protocol header carried by a transmission tunneling protocol and a user data transmission layer protocol header.

The Uu decoded data is data obtained by decoding according to a protocol that is used to connect a Uu interface, where the protocol used to connect a Uu interface may be specifically the Medium Access Control protocol (MAC, Medium Access Control), the Radio Link Control Protocol (RLC, Radio Link Control), the Packet Data Convergence Protocol (PDCP, Packet Data Convergence Protocol), or the like.

It should be noted that, in this embodiment of the present invention, step 703 may specifically include the following steps:

K1. The data transmission device performs upper layer protocol header decompression for the PDCP PDU to obtain user data IP packet data.

K2. The data transmission device decodes the user data IP protocol header and the user data transmission layer protocol header that are of the user data IP packet data to obtain decoded data.

In step K1, the data transmission device performs upper layer protocol header decompression for the PDCP PDU to obtain the user data IP packet data, and in step K2, a result is also obtained by decoding according to a protocol stack structure of a respective protocol.

704. Compress the decoded data to obtain compressed data.

Specifically, the data transmission device compresses the Uu decoded data to obtain Uu compressed data.

In this embodiment of the present invention, after the data transmission device obtains the decoded data, the data transmission device may compress the decoded data to obtain compressed data. On the transmission link, compression of decoded data by the data transmission device can increase throughput of the link.

It should be noted that, for step 704, that the data transmission device compresses the decoded data to obtain compressed data may specifically include the following steps:

L1. The data transmission device segments the decoded data to obtain multiple decoded data segments.

L2. The data transmission device generates a digital digest for each decoded data segment obtained after segmentation.

L3. The data transmission device generates a codebook according to the decoded data segments and the digital digests, where the codebook includes each digital digest and each decoded data segment and an index structure of each digital digest and each decoded data segment.

L4. The data transmission device sends the codebook to another data transmission device that belongs to the same transmission link as the data transmission device, where the another data transmission device is a decoding device that uses the codebook for decoding.

L5. The data transmission device determines, according to the codebook, whether duplicate decoded data segments exist in the multiple decoded data segments.

L6. If duplicate decoded data segments exist, the data transmission device uses digital digests corresponding to the duplicate decoded data segments to replace the duplicate decoded data segments.

L7. The data transmission device encodes non-duplicate decoded data segments and the digital digests corresponding to the duplicate decoded data segments to obtain the compressed data.

It should be noted that, in step J3, the data transmission device needs to synchronously send the generated codebook to the peer data transmission device on the transmission link, so that codebooks saved in the two data transmission devices are completely the same. After the data transmission device side performs data de-duplication, the peer data transmission device side uses the codebook to restore the data.

705. Encapsulate the compressed data according to the user data protocol header, PDCP, RLC, and MAC in sequence to obtain encapsulated data.

Specifically, the data transmission device encapsulates the compressed data according to the user data protocol header, PDCP, RLC, and MAC in sequence to obtain Uu encapsulated data.

In this embodiment of the present invention, after compressing the decoded data to obtain the compressed data, the data transmission device encapsulates the compressed data according to a protocol stack structure of the user data protocol header, and performs encapsulation according to PDCP, RLC, and MAC in sequence to obtain the Uu encapsulated data. According to the foregoing introduction, the data transmission device decodes the MAC PDU according to MAC, RLC, and PDCP in sequence. Herein encapsulation may be performed in a reverse manner.

706. The data transmission device sends the encapsulated data to a core network or a base station.

It should be noted that, the encapsulated data may be Uu encapsulated data. The data transmission device sends the encapsulated data to a decoding device in the core network or in the base station. In this embodiment of the present invention, that the data transmission device sends the Uu encapsulated data to the decoding device in the core network or in the base station may specifically include: performing, by the data transmission device, Iub interface protocol encapsulation for the Uu encapsulated data to obtain Iub encapsulated data, or sending, by the data transmission device, the Uu encapsulated data to the protocol processing module of the base station or the protocol processing module of the RNC.

It should be noted that, the performing, by the data transmission device, Iub interface protocol encapsulation for the Uu encapsulated data to obtain Iub encapsulated data includes:

encapsulating, by the data transmission device, the Uu encapsulated data according to the Frame Protocol FP to obtain FP encapsulated data;

encapsulating, by the data transmission device, the FP encapsulated data according to the User Datagram Protocol UDP and the Internet Protocol IP to obtain transmission network IP packet data; and determining whether a length of the transmission network IP packet data is greater than a length of a maximum transmission unit of a lower layer protocol; if the length of the transmission network IP packet data is greater than the length of the maximum transmission unit of the lower layer protocol, performing IP fragmentation for the transmission network IP packet data to obtain fragmented IP packet data, where the fragmented IP packet data is Iub encapsulated data; or if the length of the transmission network IP packet data is less than or equal to the length of the maximum transmission unit of the lower layer protocol, the transmission network IP packet data is the Iub encapsulated data.

It should be noted that, in this embodiment of the present invention, if the data carried by the RLC PDU is decrypted, the data transmission device first encrypts the data carried by the RLC PDU, and then performs RLC encapsulation; if the data carried by the MAC PDU is already decrypted, the data transmission device first encrypts the data carried by the MAC PDU, and then performs MAC encapsulation.

In this embodiment provided by the present invention, first a MAC PDU that is obtained by decoding according to an Iub interface protocol is acquired; then the MAC PDU is obtained by decoding according to MAC, RLC, and PDCP in sequence, and a user data protocol header is used to decode a PDCP PDU to obtain decoded data; the decoded data is compressed to obtain compressed data; and then the compressed data is encapsulated according to a user data protocol header, PDCP, RLC, and MAC in sequence to obtain Uu encapsulated data. In this optimization manner, compression of decoded data may be implemented, and a compression rate of data transmitted on a Backhaul may be increased to increase throughput of the Backhaul.

Figure 8:
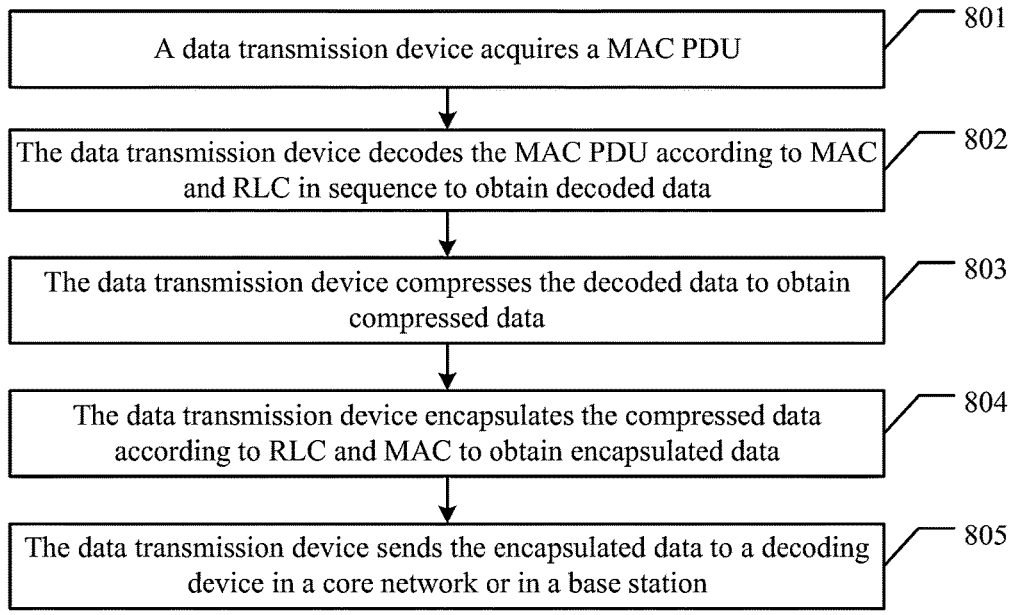
FIG. 8 is a schematic block flowchart of another data transmission method according to an embodiment of the present invention.

The foregoing embodiment introduces a data transmission method provided by the present invention. The following introduces another data transmission method provided by an embodiment of the present invention. As shown in FIG. 8, the method may mainly include the following steps:

801. A data transmission device acquires a Medium Access Control protocol data unit (MAC PDU, Medium Access Control Protocol Data Unit).

Step 801 is similar to step 701 in the foregoing embodiment, and is not described herein again.

802. The data transmission device decodes the MAC PDU according to MAC and RLC in sequence to obtain decoded data.

After acquiring the MAC PDU, the data transmission device decodes the MAC PDU according to a Uu interface protocol to obtain decoded data. The decoded data is data obtained by decoding according to a protocol that is used to connect a Uu interface, where the protocol that is used to connect a Uu interface may be specifically the Medium Access Control Protocol (MAC, Medium Access Control) or the Radio Link Control Protocol (RLC, Radio Link Control).

It should be noted that, in this embodiment of the present invention, that the data transmission device decodes the MAC PDU according to MAC and RLC in sequence to obtain decoded data may specifically include the following steps:

M1. The data transmission device decodes the MAC PDU at a MAC layer to obtain an RLC PDU.

M2. The data transmission device decodes the RLC PDU at an RLC layer to obtain decoded data.

The RLC PDU is data obtained by decoding the MAC PDU according to the MAC protocol.

In step M1, the data transmission device decodes the MAC PDU according to a protocol stack structure of the MAC protocol to obtain the RLC PDU, and in step M2, a result is also obtained by decoding according to a protocol stack structure of a respective protocol.

It should be noted that, if data carried by the MAC PDU is encrypted, the data transmission device decodes the MAC PDU at the MAC layer, decrypts the data carried by the MAC PDU, and then executes step M2. If data carried by the RLC PDU is encrypted, the data transmission device decodes the RLC PDU at the RLC layer and decrypts the data carried by the RLC PDU. The data transmission device can obtain the decoded data only after decrypting RLC decoded data.

803. The data transmission device compresses the decoded data to obtain compressed data.

In this embodiment of the present invention, after the data transmission device obtains the decoded data, the data transmission device may compress the decoded data to obtain compressed data. On a transmission link, compression of decoded data by the data transmission device can increase throughput of the link.

It should be noted that, for step 802, that the data transmission device compresses the decoded data to obtain compressed data may specifically include the following steps:

N1. The data transmission device segments the decoded data to obtain multiple decoded data segments.

N2. The data transmission device generates a digital digest for each decoded data segment obtained after segmentation.

N3. The data transmission device generates a codebook, where the codebook includes each digital digest and each decoded data segment and an index structure of each digital digest and each decoded data segment.

N4. The data transmission device sends the codebook to another data transmission device that belongs to the same transmission link as the data transmission device, where the another data transmission device is a decoding device that uses the codebook for decoding.

N5. The data transmission device determines, according to the index structure of each digital digest and each decoded data segment, whether duplicate decoded data segments exist.

N6. If duplicate decoded data segments exist, the data transmission device uses digital digests corresponding to the duplicate decoded data segments to replace the duplicate decoded data segments.

N7. The data transmission device encodes non-duplicate decoded data segments and the digital digests corresponding to the duplicate decoded data segments to obtain the compressed data.

It should be noted that, in step N3, the data transmission device needs to synchronously send the generated codebook to the peer data transmission device on the transmission link, so that codebooks saved in the two data transmission devices are completely the same. After the data transmission device side performs data de-duplication, the peer data transmission device restores the data.

804. The data transmission device encapsulates the compressed data according to RLC and MAC to obtain encapsulated data.

In this embodiment of the present invention, after compressing the decoded data to obtain compressed data, the data transmission device performs encapsulation according to PDCP, RLC, and MAC to obtain Uu encapsulated data. According to the foregoing introduction, the data transmission device decodes the MAC PDU according to MAC and RLC in sequence. Herein encapsulation may be performed in a reverse manner.

805. The data transmission device sends the encapsulated data to a decoding device in a core network or in a base station.

It should be noted that, in this embodiment of the present invention, that the data transmission device sends the Uu encapsulated data to the decoding device in the core network or in the base station may specifically include: performing, by the data transmission device, Iub interface protocol encapsulation for the Uu encapsulated data to obtain Iub encapsulated data, or sending, by the data transmission device, the Uu encapsulated data to a protocol processing module of the base station or a protocol processing module of an RNC.

It should be noted that, the performing, by the data transmission device, Iub interface protocol encapsulation for the Uu encapsulated data to obtain Iub encapsulated data, includes:

encapsulating, by the data transmission device, the Uu encapsulated data according to the Frame Protocol FP to obtain FP encapsulated data;

encapsulating, by the data transmission device, the FP encapsulated data according to the User Datagram Protocol UDP and the Internet Protocol IP to obtain transmission network IP packet data; and determining whether a length of the transmission network IP packet data is greater than a length of a maximum transmission unit of a lower layer protocol; if the length of the transmission network IP packet data is greater than the length of the maximum transmission unit of the lower layer protocol, performing IP fragmentation for the transmission network IP packet data to obtain fragmented IP packet data, where the fragmented IP packet data is Iub encapsulated data; or if the length of the transmission network IP packet data is less than or equal to the length of the maximum transmission unit of the lower layer protocol, the transmission network IP packet data is the Iub encapsulated data.

It should be noted that, in this embodiment of the present invention, if the data carried by the RLC PDU is decrypted, the data transmission device first encrypts the data carried by the RLC PDU, and then performs RLC encapsulation; if the data carried by the MAC PDU is decrypted, the data transmission device first encrypts the data carried by the MAC PDU, and then performs MAC encapsulation.

In this embodiment provided by the present invention, a data transmission device first obtains a MAC PDU that is obtained by decoding according to an Iub interface protocol; then decodes the MAC PDU according to MAC and RLC in sequence to obtain decoded data; then compresses the decoded data to obtain compressed data; and then encapsulates the compressed data according to RLC and MAC in sequence to obtain Uu encapsulated data. In this optimization manner, compression of decoded data may be implemented, and a compression rate of data transmitted on a Backhaul may be increased to increase throughput of the Backhaul.

Figure 9:
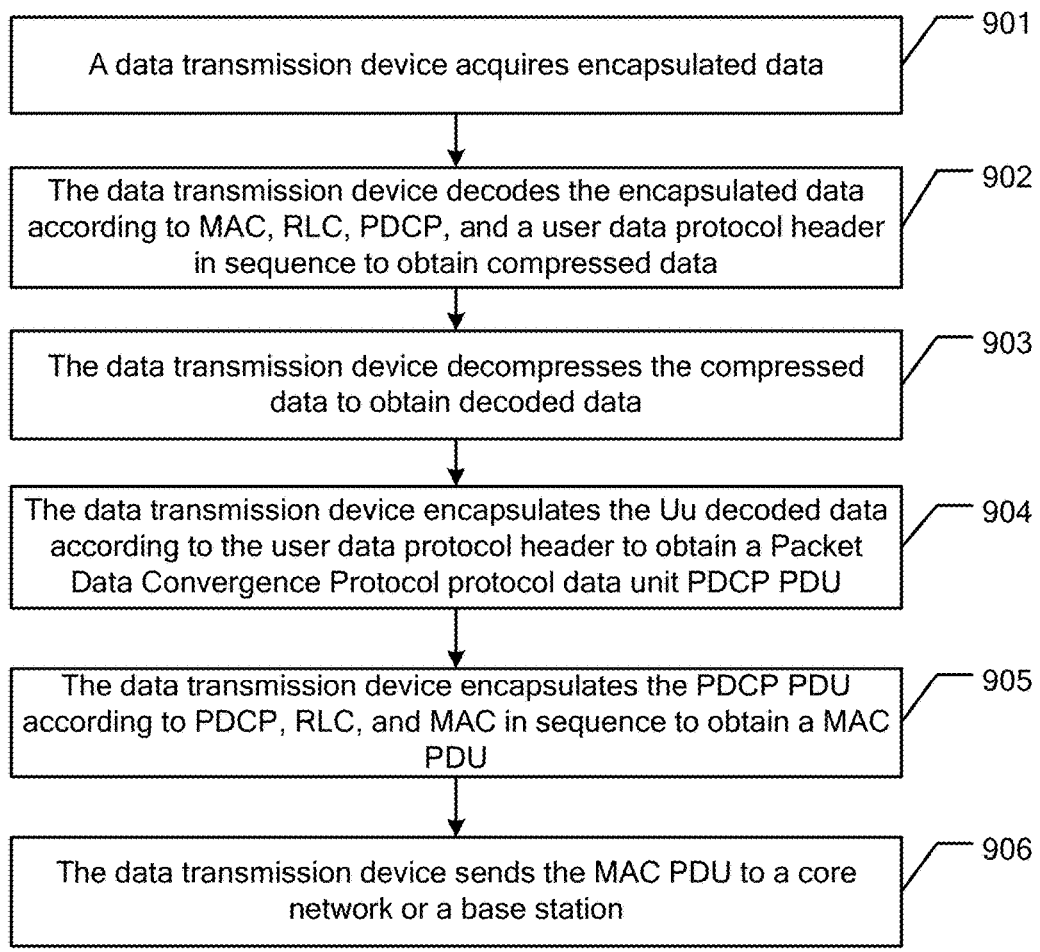
FIG. 9 is a schematic block flowchart of another data transmission method according to an embodiment of the present invention.

The foregoing embodiment introduces a data transmission device located at one end of a backhaul link and configured to implement de-duplication of transmitted data during a complete data transmission process. The following introduces a data transmission device located at the other end of the backhaul link and configured to implement restoration of the transmitted data. Referring to FIG. 9, a data transmission method provided by an embodiment of the present invention is corresponding to the embodiment shown in FIG. 7, and includes:

901. A data transmission device acquires encapsulated data.

In this embodiment of the present invention, specifically, the data transmission device for data restoration first receives Uu encapsulated data from a transmission link. For the introduction to the Uu encapsulated data, refer to the corresponding introduction in the embodiment shown in FIG. 7.

It should be noted that, in this embodiment of the present invention, that the data transmission device acquires the Uu encapsulated data may include: receiving, by the data transmission device, an IP data packet sent by a radio network controller (RNC, Radio Network Controller); and decoding, by the data transmission device, the IP data packet according to an Iub interface protocol to obtain the Uu encapsulated data.

902. The data transmission device decodes the encapsulated data according to MAC, RLC, PDCP, and a user data protocol header in sequence to obtain compressed data.

Specifically, herein, after receiving Uu encapsulated data, the data transmission device decapsulates the Uu encapsulated data in a manner reverse to the encapsulation method according to a manner of encapsulating Uu compressed data in step 705 of the foregoing embodiment, and may obtain the Uu compressed data.

903. The data transmission device decompresses the compressed data to obtain decoded data.

Herein the data transmission device decompresses the compressed data in a manner reverse to the manner of compressing the decoded data in step 704 in the foregoing embodiment, and the data transmission device may obtain the decoded data.

It should be noted that, in this embodiment of the present invention, in an implementation manner, that the data transmission device decompresses the compressed data to obtain the decoded data may specifically include the following steps:

O1. The data transmission device receives a codebook from another data transmission device that belongs to the same transmission link as the data transmission device, where the codebook includes each digital digest and each decoded data segment and an index structure of each digital digest and each decoded data segment, where the another data transmission device is an encoding device.

O2. The data transmission device determines, according to the codebook, whether duplicate decoded data segments exist in the compressed data.

O3. If duplicate decoded data segments exist, the data transmission device decodes the compressed data to obtain non-duplicate decoded data segments and digital digests corresponding to the duplicate decoded data segments.

O4. The data transmission device restores the digital digests corresponding to the duplicate decoded data segments that are obtained by decoding, to the duplicate decoded data segments.

O5. The data transmission device assembles the duplicate decoded data segments and the non-duplicate decoded data segments to obtain the decoded data.

Herein the data restoration process described in steps O1 to O5 is reverse to the data compression process described in the foregoing embodiment. Because the data transmission device knows how the other data transmission device on the same transmission link compresses data, herein the data transmission device may restore the data in a reverse manner.

904. The data transmission device encapsulates the decoded data according to the user data protocol header to obtain a Packet Data Convergence Protocol protocol data unit PDCP PDU.

905. The data transmission device encapsulates the PDCP PDU according to PDCP, RLC, and MAC in sequence to obtain a MAC PDU.

906. The data transmission device sends the MAC PDU to a core network or a base station.

In this embodiment of the present invention, after receiving, through the transmission link, the Uu encapsulated data sent by the encoding device, the data transmission device, which is used as a decoding device, restores the Uu encapsulated data by executing steps 902 to 905, to obtain the MAC PDU, and then sends the MAC PDU to the core network or the base station.

In this embodiment provided by the present invention, a data transmission device first acquires Uu encapsulated data; the data transmission device decodes the Uu encapsulated data according to MAC, RLC, PDCP, and a user data protocol header in sequence to obtain compressed data, then decompresses the compressed data to obtain decoded data, and finally encapsulates the decoded data by using the user data protocol header, PDCP, RLC, and MAC to obtain a MAC PDU. Because Uu encapsulated data is restored to a MAC PDU, compression of data transmitted on a Backhaul may be implemented to increase throughput of the Backhaul.

Figure 10:
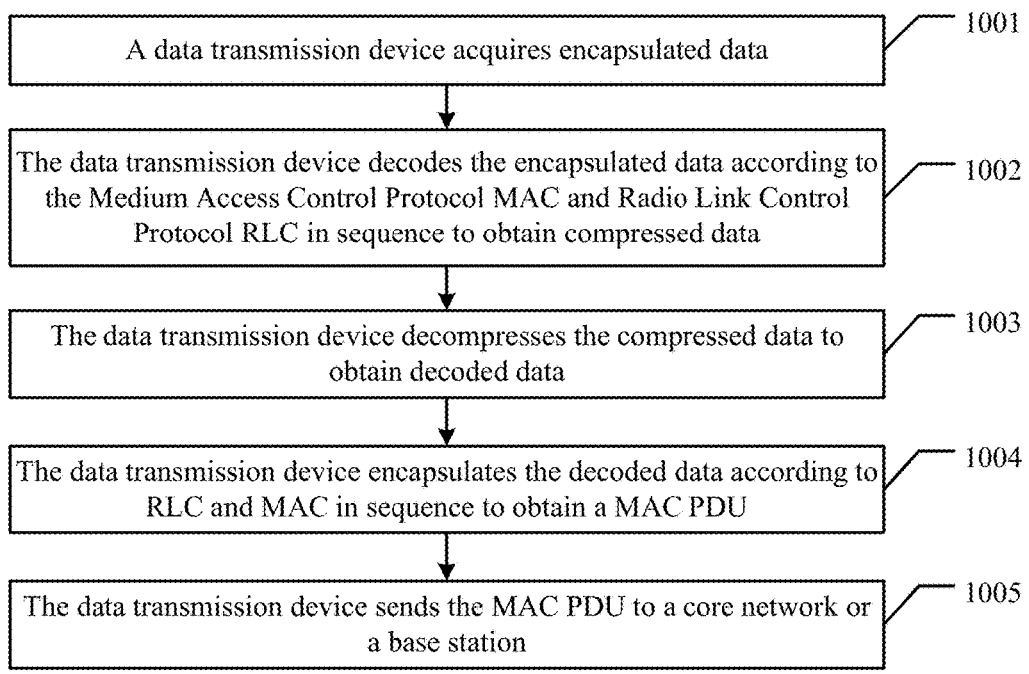
FIG. 10 is a schematic block flowchart of another data transmission method according to an embodiment of the present invention.

The following introduces a data transmission device located at the other end of the backhaul link and configured to implement restoration of transmitted data. Referring to FIG. 10, a data transmission method provided by an embodiment of the present invention is corresponding to the embodiment shown in FIG. 8, and includes:

1001. A data transmission device acquires encapsulated data.

Step 1001 is similar to step 901 in the foregoing embodiment, and is not described herein again.

1002. The data transmission device decodes the encapsulated data according to the Medium Access Control Protocol MAC and the Radio Link Control Protocol RLC in sequence to obtain compressed data.

Specifically, herein, after receiving Uu encapsulated data, the data transmission device decapsulates the Uu encapsulated data in a manner reverse to the encapsulation method according to a manner of encapsulating Uu compressed data in step 804 of the foregoing embodiment, and may obtain the Uu compressed data.

1003. The data transmission device decompresses the compressed data to obtain decoded data.

Herein the data transmission device decompresses the compressed data in a manner reverse to the manner of compressing the decoded data in step 803 in the foregoing embodiment, and the data transmission device may obtain the decoded data.

It should be noted that, in this embodiment of the present invention, in an implementation manner, that the data transmission device decompresses the compressed data to obtain the decoded data may specifically include the following steps:

P1. The data transmission device receives a codebook from another data transmission device that belongs to a same transmission link as the data transmission device, where the codebook includes each digital digest and each decoded data segment and an index structure of each digital digest and each decoded data segment, where the another data transmission device is an encoding device.

P2. The data transmission device determines, according to the codebook, whether duplicate decoded data segments exist in the compressed data.

P3. If duplicate decoded data segments exist, the data transmission device decodes the compressed data to obtain non-duplicate decoded data segments and digital digests corresponding to the duplicate decoded data segments.

P4. The data transmission device restores the digital digests corresponding to the duplicate decoded data segments that are obtained by decoding, to the duplicate decoded data segments.

P5. The data transmission device assembles the duplicate decoded data segments and the non-duplicate decoded data segments to obtain user application layer data.

Herein the data restoration process described in steps P1 to P5 is reverse to the data compression process described in the foregoing embodiment. Because the data transmission device knows how the other data transmission device on the same transmission link compresses data, herein the data transmission device may restore the data in a reverse manner.

1004. The data transmission device encapsulates the decoded data according to RLC and MAC in sequence to obtain a MAC PDU.

The data transmission device encapsulates the decoded data according to a protocol stack structure of a Uu interface, to obtain a MAC PDU.

1005. The data transmission device sends the MAC PDU to a core network or a base station.

In this embodiment provided by the present invention, a data transmission device first acquires encapsulated data; the data transmission device decodes the encapsulated data according to MAC and RLC in sequence to obtain compressed data, and then decompresses the compressed data to obtain decoded data, and finally uses RLC and MAC to encapsulate the decoded data to obtain a MAC PDU. Because Uu encapsulated data is restored to a MAC PDU, compression of data transmitted on a Backhaul may be implemented to increase throughput of the Backhaul.

Figure 11:
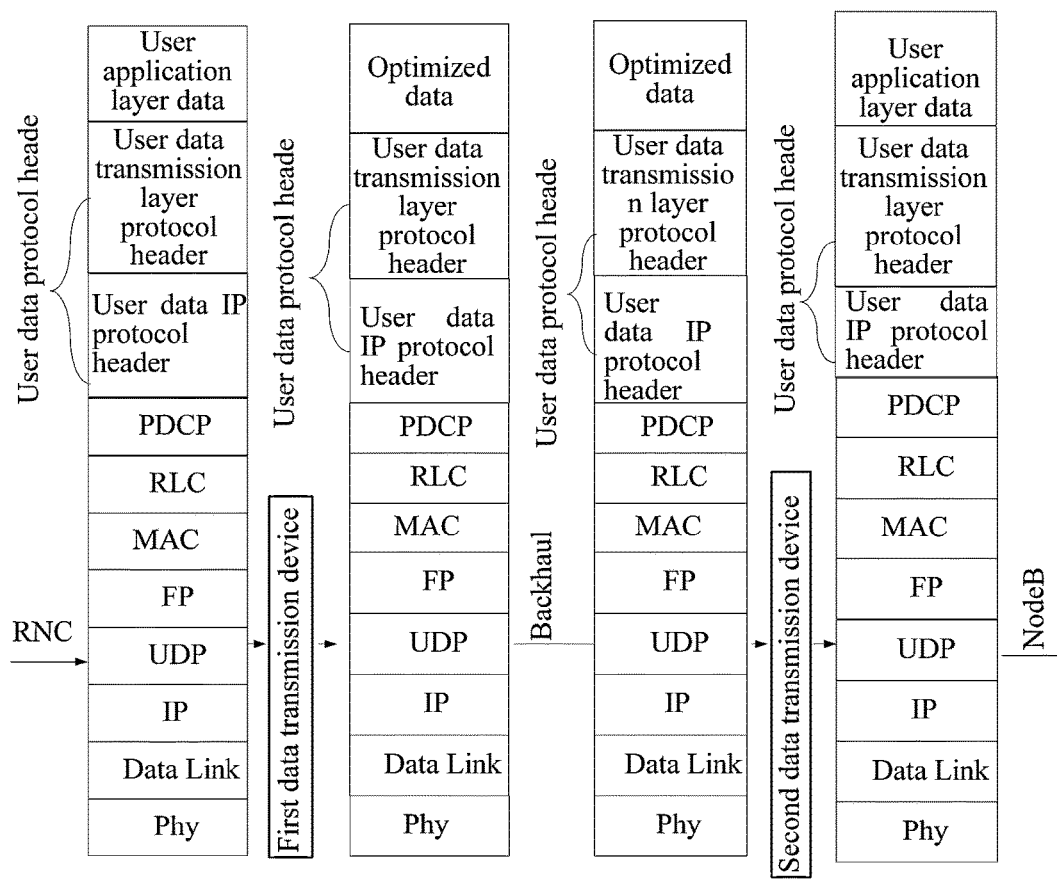
FIG. 11 is another schematic diagram of interaction between a first data transmission device and a second data transmission device according to an embodiment of the present invention.

With respect to the foregoing embodiments shown in FIG. 7 and FIG. 9, and FIG. 8 and FIG. 10, the following uses an actual application scenario for detailed description. A complete process of transmitting data on a Backhaul is described in the following with reference to FIG. 11, which is a schematic diagram of data interaction between a first data transmission device and a second data transmission device. It should be noted that, the first data transmission device may be specifically the data transmission device described in the embodiment shown in FIG. 7, and the second data transmission device may be specifically the data transmission device described in the embodiment shown in FIG. 9. Herein first and second are used to distinguish the two data transmission devices deployed at two ends of the Backhaul described in FIG. 7 and FIG. 9. The device deployed at one end of the Backhaul is the first data transmission device, and the device deployed on the other end of the Backhaul is the second data transmission device. The first data transmission device is configured to implement compression of data, and the second data transmission device is configured to implement restoration of the data. The first data transmission device may also be specifically the data transmission device described in the embodiment shown in FIG. 8, and the second data transmission device may also be specifically the data transmission device described in the embodiment shown in FIG. 10, which are only for description.

The first data transmission device first performs IP fragment assembly for an IP data packet received by an RNC, to obtain transmission network IP packet data, where Phy indicates physical layer data and Data Link indicates data link layer data. In this embodiment of the present invention, the first data transmission device uses the transmission network IP packet data of a transmission network layer as an optimized object, and the first data transmission device parses the transmission network IP packet data. Assuming that Iub interface protocols are IP, UDP, and FP, and that Uu interface protocols are MAC, RLC, and PDCP, an algorithm may include the following steps:

First, an RLC PDU link table needs to be created.
Algorithm steps are as follows:

1. Perform parsing by using the IP/UDP protocol to obtain a UDP payload.
2. Decode the UDP payload by using the FP protocol according to the 3GPP TS 25.434 standard to obtain a MAC PDU, and in a case of encryption at a MAC layer, complete decryption.
3. Decode the MAC PDU at the MAC layer according to the 3GPP TS 25.321 standard to obtain an RLC PDU.
4. Complete RLC decryption according to the 3GPP TS 25.322 standard in a case of encryption at an RLC layer, and obtain a decrypted RLC PDU.
5. Put the RLC PDU in the RLC link table.
6. Cyclically execute step 2 to step 5 until an entire FP data frame is decoded.
7. Fetch the RLC PDU from the RLC PDU link table to complete reassembly, to obtain a PDCP PDU.
8. Decode the PDCP PDU according to the 3GPP TS 25.323 standard, and complete upper layer protocol header decompression, to obtain user data IP packet data.
9. Decode a user data IP protocol header and a user data transmission layer protocol header that are of the user data IP packet data to obtain decoded data.
10. Compress the decoded data to obtain compressed data, namely, optimized data shown in FIG. 11.
11. Invoke PDCP, RLC, and MAC encapsulating modules layer by layer to complete Uu interface protocol encapsulation, to obtain Uu encapsulated data, and release the RLC link table.
12. Re-encapsulate the FP data frame according to an FP protocol frame format in step 2 and an FP format table.
13. Perform UDP and IP protocol encapsulation, and re-calculate Length and Checksum fields.
14. Resend data to a Backhaul.

An implementation manner of the second data transmission device is just reverse to the process of the first data transmission device, and is not described herein again.

Figure 12:
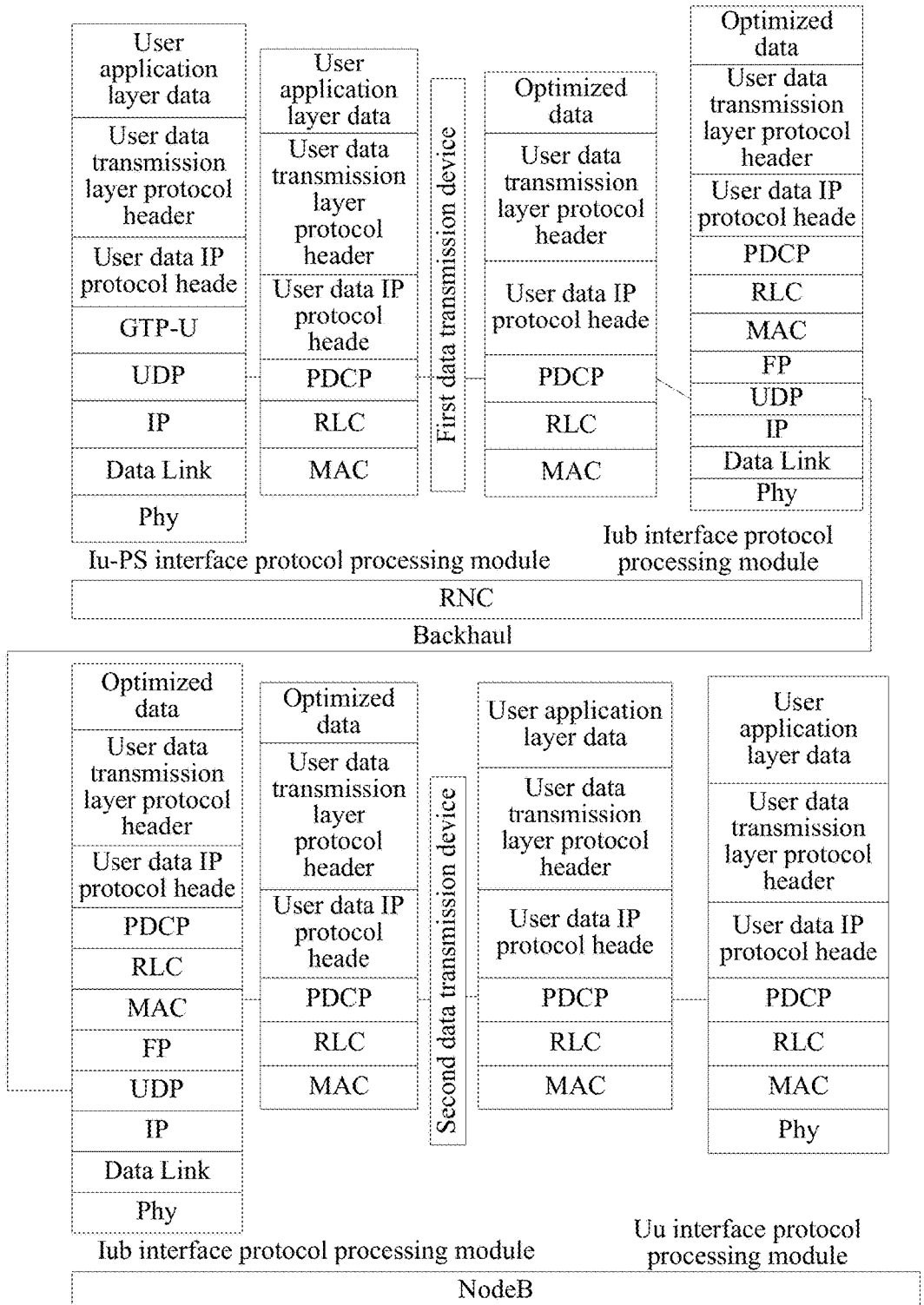
FIG. 12 is another schematic diagram of interaction between a first data transmission device and a second data transmission device according to an embodiment of the present invention.

The following uses another actual application scenario for detailed description. Referring to FIG. 12, the first data transmission device is deployed, in a form of a module, between an Iub interface protocol processing module and a Uu interface protocol processing module in an RNC. The first data transmission device uses user application layer data as an optimized object of content encoding. Because a base station has completed Iub interface protocol processing, the first data transmission device only needs to provide adaptation for a Uu interface protocol. In addition, an encryption problem still needs to be resolved. For details, refer to steps 3 to 8 of the foregoing algorithm, and steps 11 to 13 of the foregoing algorithm. A structure of the base station needs to be modified in the method introduced herein. However, in comparison with the foregoing embodiment, parsing and encapsulation of the Iub interface protocol are reduced, but a key still needs to be acquired from the RNC to decrypt an encrypted MAC/RLC layer of the Uu interface protocol.

An implementation manner of the second data transmission device is just reverse to the process of the first data transmission device, and is not described herein again.

The following introduces another application scenario. An RLC PDU obtained after decryption at a radio network layer is used an object of content encoding, and the RLC PDU is de-duplicated and encoded as original data. Corresponding to the foregoing embodiment, implementation manners of the first data transmission device are described as follows:

(1) The de-duplication algorithm executes steps 1 to 4 of the foregoing embodiment to obtain a decrypted RLC PDU, directly perform de-duplication and encoding for the RLC PDU, and then complete encapsulation of the MAC layer, an FP frame, and UDP/IP.

(2) The de-duplication algorithm executes steps 3 and 4 of the foregoing embodiment to obtain a decrypted RLC PDU, directly perform de-duplication and encoding for the RLC PDU, and then complete encapsulation of the MAC layer.

An implementation manner of the second data transmission device is just reverse to the process of the first data transmission device, and is not described herein again.

Figure 13:
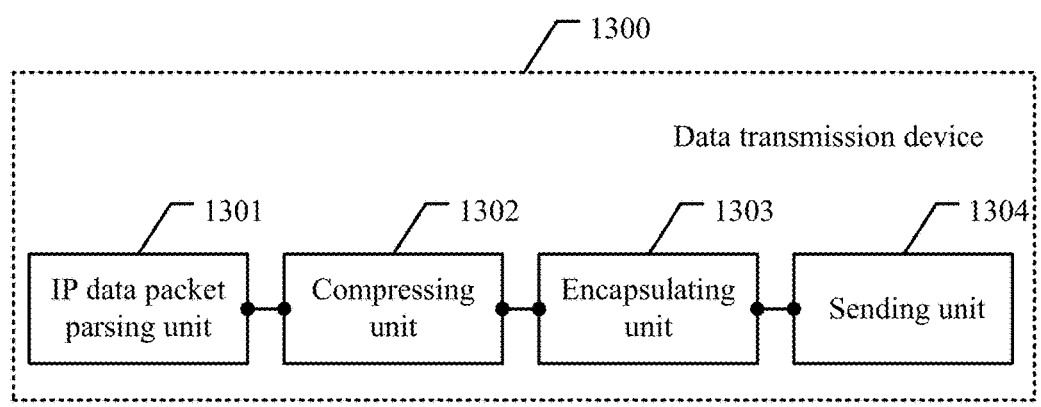
FIG. 13 is a schematic composition diagram of a structure of a data transmission device according to an embodiment of the present invention.

The foregoing embodiments describe the data transmission methods provided by the embodiments of the present invention. The following introduces a data transmission device provided by an embodiment of the present invention. As shown in FIG. 13, a data transmission device 1300 includes an IP data packet parsing unit 1301, a compressing unit 1302, an encapsulating unit 1303, and a sending unit 1304, where:

the IP data packet parsing unit 1301 is configured to parse a received Internet Protocol IP data packet to obtain a transmission network protocol header, a transmission tunneling protocol header, a user data protocol header, and user application layer data;

the compressing unit 1302 is configured to compress the transmission tunneling protocol header, the user data protocol header, and the user application layer data to obtain a compressed transmission network protocol payload;

the encapsulating unit 1303 is configured to use the transmission network protocol header to encapsulate the compressed transmission network protocol payload to obtain a compressed IP data packet; and the sending unit 1304 is configured to send the compressed IP data packet to a core network or a base station.

It should be noted that, the IP data packet parsing unit 1301 provided by this embodiment of the present invention, in a possible implementation manner, includes (not shown in FIG. 13):

a first fragment reassembly subunit, configured to: if IP fragments exist in the IP data packet, perform IP fragment reassembly for the IP data packet in which IP fragments exist, to acquire complete transmission network IP packet data;

a first acquiring subunit, configured to acquire a transmission network IP protocol header and a length of the transmission network IP protocol header according to a header of the transmission network IP packet data;

a second acquiring subunit, configured to determine a protocol type of a transmission network transmission layer protocol according to a protocol type field in the header of the transmission network IP packet data, and then acquire a transmission network transmission layer protocol header and a length of the transmission network transmission layer protocol header according to the protocol type of the transmission network transmission layer protocol; further specifically, acquire the transmission network transmission layer protocol header and a corresponding field according to the protocol type of the transmission network transmission layer protocol, and acquire the length of the transmission network transmission layer protocol header according to the transmission network transmission layer protocol header and the corresponding field;

a third acquiring subunit, configured to acquire a length of the transmission network protocol header according to the length of the transmission network IP protocol header and the length of the transmission network transmission layer protocol header, where the length of the transmission network protocol header is the length of the transmission network IP protocol header plus the length of the transmission network transmission layer protocol header; and a fourth acquiring subunit, configured to acquire the transmission network protocol header according to the transmission network IP packet data and the length of the transmission network protocol header, where the transmission network protocol header is data from a beginning of the transmission network IP packet data and corresponding to a length that is the length of the transmission network protocol header.

It should be noted that, the IP data packet parsing unit 1301 provided by this embodiment of the present invention, in another possible implementation manner, includes (not shown in FIG. 13):

a calculating subunit, configured to calculate a length of a fixed header of a transmission tunneling protocol according to a protocol type of the transmission tunneling protocol;

a first determining subunit, configured to determine, according to a field corresponding to the protocol type of the transmission tunneling protocol, whether any optional field exists in the transmission tunneling protocol header;

a fifth acquiring subunit, configured to: when no optional field exists, acquire a length of the transmission tunneling protocol header according to the length of the fixed header of the transmission tunneling protocol, where the length of the transmission tunneling protocol header is the length of the fixed header of the transmission tunneling protocol;

a second determining subunit, configured to: when an optional field exists, determine, according to a field corresponding to the protocol type of the transmission tunneling protocol, whether any extension header exists in the transmission tunneling protocol header;

a sixth acquiring subunit, configured to: when no extension header exists, acquire the length of the transmission tunneling protocol header according to the length of the fixed header of the transmission tunneling protocol and a length of the optional field, where the length of the transmission tunneling protocol header is the length of the fixed header of the transmission tunneling protocol plus the length of the optional field;

a seventh acquiring subunit, configured to: when an extension header exists, acquire the length of the transmission tunneling protocol header according to the length of the fixed header of the transmission tunneling protocol, the length of the optional field, and a length of the extension header, where the length of the transmission tunneling protocol header is the length of the fixed header of the transmission tunneling protocol plus the length of the optional field plus the length of the extension header; and an eighth acquiring subunit, configured to acquire the transmission tunneling protocol header according to the transmission network IP packet data and the transmission network protocol header, where the transmission tunneling protocol header is data starting after the transmission network protocol header in the transmission network IP packet data and corresponding to a length that is the length of the transmission tunneling protocol header.

It should be noted that, the IP data packet parsing unit 1301 provided by this embodiment of the present invention, in another possible implementation manner, includes (not shown in FIG. 13):

a second fragment reassembly subunit, configured to: when IP fragments exist in data carried by a transmission tunneling protocol, perform IP fragment reassembly for the data carried by the transmission tunneling protocol to acquire complete user data IP packet data;

a ninth acquiring subunit, configured to acquire a length of a user data IP protocol header according to a header of the user data IP packet data;

a tenth acquiring subunit, configured to acquire a protocol type of a user data transmission layer protocol according to a protocol type field in the header of the user data IP packet data, acquire a user data transmission layer protocol header and a corresponding field according to the protocol type of the user data transmission layer protocol, and acquire a length of the user data transmission layer protocol header according to the user data transmission layer protocol header and the corresponding field;

an eleventh acquiring subunit, configured to acquire a length of the user data protocol header according to the length of the user data IP protocol header and the length of the user data transmission layer protocol header, where the length of the user data protocol header is the length of the user data IP protocol header plus the length of the user data transmission layer protocol header; and a twelfth acquiring subunit, configured to acquire the user data protocol header according to the transmission network IP packet data and the length of the user data protocol header, where the user data protocol header is data starting after the transmission tunneling protocol header in the transmission network IP packet data and corresponding to a length that is the length of the user data protocol header.

It should be noted that, the compressing unit 1302 provided by this embodiment of the present invention, in a possible implementation manner, includes (not shown in FIG. 13):

a first compressing subunit, configured to perform header compression for the transmission tunneling protocol header and the user data protocol header to obtain a result of header compression;

a second compressing subunit, configured to compress the user application layer data to obtain compressed user application layer data; and an encoding subunit, configured to encode the result of header compression and the compressed user application layer data to obtain the compressed transmission network protocol payload.

It should be noted that, the data transmission device 1300 provided by this embodiment of the present invention, in a possible implementation manner, may further include (not shown in FIG. 13):

a determining unit, configured to determine whether a length of the compressed IP data packet is greater than a length of a maximum transmission unit of a lower layer protocol; and a fragmenting unit, configured to: when the length of the compressed IP data packet is greater than the length of the maximum transmission unit of the lower layer protocol, perform IP fragmentation for the compressed IP data packet to obtain compressed IP data packet fragments;

the sending unit is specifically configured to send the compressed IP data packet fragments to the core network or the base station.

In this embodiment provided by the present invention, an IP data packet parsing unit parses a received IP data packet to obtain a transmission network protocol header, a transmission tunneling protocol header, a user data protocol header, and user application layer data; then a compressing unit compresses the transmission tunneling protocol header, the user data protocol header, and the user application layer data; and then an encapsulating unit uses the transmission network protocol header to encapsulate a compressed transmission network protocol payload to obtain a compressed IP data packet. In this optimization manner, compression of user application layer data may be implemented, and a compression rate of data transmitted on a Backhaul may be increased to increase throughput of the Backhaul.

Figure 14:
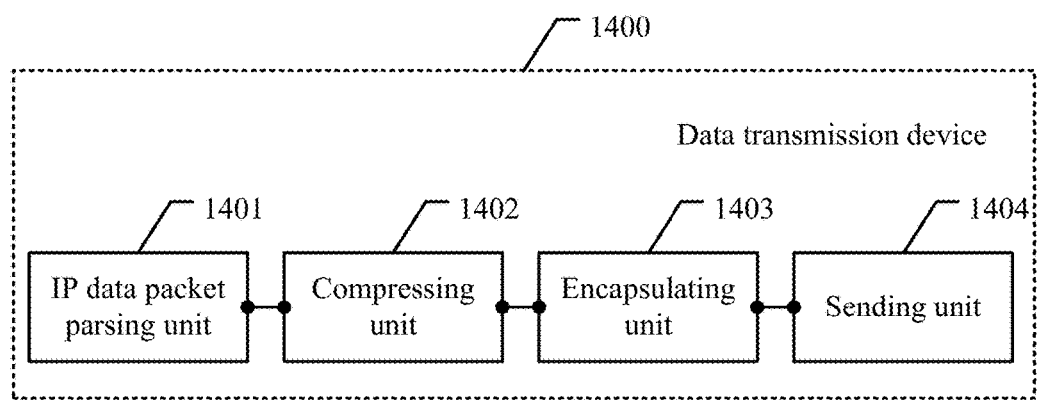
FIG. 14 is a schematic composition diagram of a structure of another data transmission device according to an embodiment of the present invention.

The foregoing embodiment introduces a data transmission device provided by the present invention. The following introduces another data transmission device provided by an embodiment of the present invention. As shown in FIG. 14, a data transmission device 1400 includes an IP data packet parsing unit 1401, a compressing unit 1402, an encapsulating unit 1403, and a sending unit 1404, where:

the IP data packet parsing unit 1401 is configured to parse a received Internet Protocol IP data packet to obtain a transmission network protocol header, a transmission tunneling protocol header, a user data protocol header, and user application layer data;

the compressing unit 1402 is configured to compress the user application layer data to obtain a compressed user data protocol payload;

the encapsulating unit 1403 is configured to use the user data protocol header, the transmission tunneling protocol header, and the transmission network protocol header to encapsulate the compressed user data protocol payload to obtain a compressed IP data packet; and the sending unit 1404 is configured to send the compressed IP data packet to a core network or a base station.

It should be noted that, the IP data packet parsing unit 1401 provided by this embodiment of the present invention, in a possible implementation manner, includes (not shown in FIG. 14):

a first fragment reassembly subunit, configured to: if IP fragments exist in the IP data packet, perform IP fragment reassembly for the IP data packet in which IP fragments exist, to acquire complete transmission network IP packet data;

a first acquiring subunit, configured to acquire a transmission network IP protocol header and a length of the transmission network IP protocol header according to a header of the transmission network IP packet data;

a second acquiring subunit, configured to determine a protocol type of a transmission network transmission layer protocol according to a protocol type field in the header of the transmission network IP packet data, and then acquire a transmission network transmission layer protocol header and a corresponding field according to the protocol type of the transmission network transmission layer protocol, and acquire a length of the transmission network transmission layer protocol header according to the transmission network transmission layer protocol header and the corresponding field;

a third acquiring subunit, configured to acquire a length of the transmission network protocol header according to the length of the transmission network IP protocol header and the length of the transmission network transmission layer protocol header, where the length of the transmission network protocol header is the length of the transmission network IP protocol header plus the length of the transmission network transmission layer protocol header; and a fourth acquiring subunit, configured to acquire the transmission network protocol header according to the transmission network IP packet data and the length of the transmission network protocol header, where the transmission network protocol header is data from a beginning of the transmission network IP packet data and corresponding to a length that is the length of the transmission network protocol header.

It should be noted that, the IP data packet parsing unit 1401 provided by this embodiment of the present invention, in another possible implementation manner, includes (not shown in FIG. 14):

a calculating subunit, configured to calculate a length of a fixed header of a transmission tunneling protocol according to a protocol type of the transmission tunneling protocol;

a first determining subunit, configured to determine, according to a field corresponding to the protocol type of the transmission tunneling protocol, whether any optional field exists in the transmission tunneling protocol header;

a fifth acquiring subunit, configured to: when no optional field exists, acquire a length of the transmission tunneling protocol header according to the length of the fixed header of the transmission tunneling protocol, where the length of the transmission tunneling protocol header is the length of the fixed header of the transmission tunneling protocol;

a second determining subunit, configured to: when an optional field exists, determine, according to a field corresponding to the protocol type of the transmission tunneling protocol, whether any extension header exists in the transmission tunneling protocol header;

a sixth acquiring subunit, configured to: when no extension header exists, acquire the length of the transmission tunneling protocol header according to the length of the fixed header of the transmission tunneling protocol and a length of the optional field, where the length of the transmission tunneling protocol header is the length of the fixed header of the transmission tunneling protocol plus the length of the optional field;

a seventh acquiring subunit, configured to: when an extension header exists, acquire the length of the transmission tunneling protocol header according to the length of the fixed header of the transmission tunneling protocol, the length of the optional field, and a length of the extension header, where the length of the transmission tunneling protocol header is the length of the fixed header of the transmission tunneling protocol plus the length of the optional field plus the length of the extension header; and an eighth acquiring subunit, configured to acquire the transmission tunneling protocol header according to the transmission network IP packet data and the transmission network protocol header, where the transmission tunneling protocol header is data starting after the transmission network protocol header in the transmission network IP packet data and corresponding to a length that is the length of the transmission tunneling protocol header.

It should be noted that, the IP data packet parsing unit 1401 provided by this embodiment of the present invention, in another possible implementation manner, includes (not shown in FIG. 14):

a second fragment reassembly subunit, configured to: when IP fragments exist in data carried by a transmission tunneling protocol, perform IP fragment reassembly for the data carried by the transmission tunneling protocol to acquire complete user data IP packet data;

a ninth acquiring subunit, configured to acquire the length of the user data IP protocol header according to a header of the user data IP packet data;

a tenth acquiring subunit, configured to acquire a protocol type of a user data transmission layer protocol according to a protocol type field in the header of the user data IP packet data, acquire a user data transmission layer protocol header and a corresponding field according to the protocol type of the user data transmission layer protocol, and acquire a length of the user data transmission layer protocol header according to the user data transmission layer protocol header and the corresponding field;

an eleventh acquiring subunit, configured to acquire a length of the user data protocol header according to the length of the user data IP protocol header and the length of the user data transmission layer protocol header, where the length of the user data protocol header is the length of the user data IP protocol header plus the length of the user data transmission layer protocol header; and a twelfth acquiring subunit, configured to acquire the user data protocol header according to the transmission network IP packet data and the length of the user data protocol header, where the user data protocol header is data starting after the transmission tunneling protocol header in the transmission network IP packet data and corresponding to a length that is the length of the user data protocol header.

It should be noted that, the compressing unit 1402 provided by this embodiment of the present invention, in a possible implementation manner, includes (not shown in FIG. 14):

a third determining subunit, configured to determine whether the user data transmission layer protocol is the Transmission Control Protocol TCP;

a thirteenth acquiring subunit, configured to acquire the user application layer data when the user data transmission layer protocol is TCP, where the user application layer data is a data payload Payload after TCP session reassembly;

a segmenting subunit, configured to segment the user application layer data to obtain multiple user application layer data segments;

a digest generating subunit, configured to generate a digital digest for each user application layer data segment obtained after segmentation;

a codebook generating subunit, configured to generate a codebook according to the user application layer data and the digital digests, where the codebook includes each digital digest and each user application layer data segment and an index structure of each digital digest and each user application layer data segment;

a codebook sending subunit, configured to send the codebook to a decoding device that uses the codebook for decoding, where the codebook sending subunit in practice is an optional component;

a fourth determining subunit, configured to determine, according to the codebook, whether duplicate user application layer data segments exist in the multiple user application layer data segments;

a replacing subunit, configured to: when duplicate user application layer data segments exist in the multiple user application layer data segments, use digital digests corresponding to the duplicate user application layer data segments to replace the duplicate user application layer data segments; and an encoding subunit, configured to encode non-duplicate user application layer data segments and the digital digests corresponding to the duplicate user application layer data segments to obtain the compressed user data protocol payload.

In another embodiment provided by the present invention, an IP data packet parsing unit parses a received IP data packet to obtain a transmission network protocol header, a transmission tunneling protocol header, a user data protocol header, and user application layer data; then a compressing unit compresses the user application layer data; and then an encapsulating unit uses the user data protocol header, the transmission tunneling protocol header, and the transmission network protocol header to encapsulate a compressed user data protocol payload to obtain a compressed IP data packet. In this optimization manner, compression of user application layer data may be implemented, and a compression rate of data transmitted on a Backhaul may be increased to increase throughput of the Backhaul.

Figure 15:
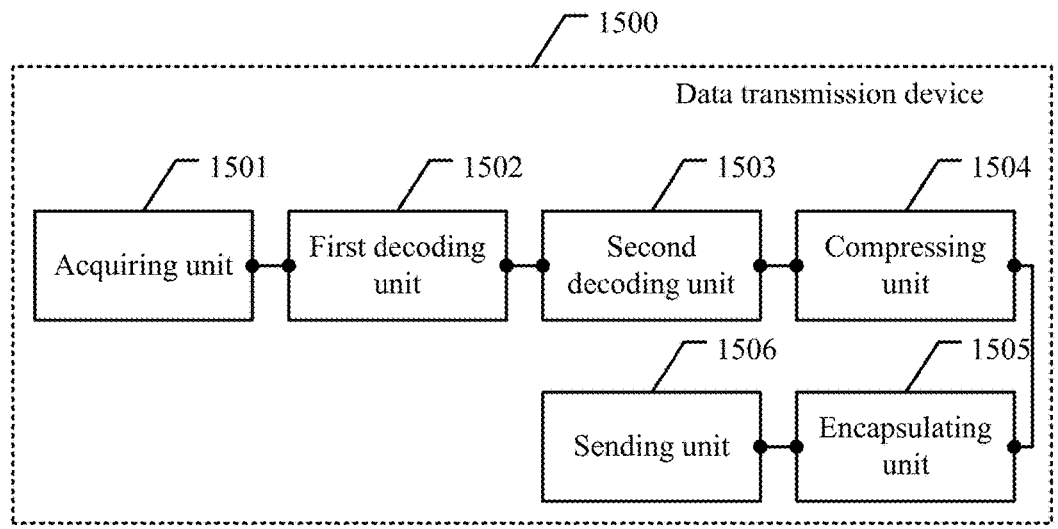
FIG. 15 is a schematic composition diagram of a structure of another data transmission device according to an embodiment of the present invention.

The following introduces another data transmission device provided by an embodiment of the present invention. As shown in FIG. 15, a data transmission device 1500 includes an acquiring unit 1501, a first decoding unit 1502, a second decoding unit 1503, a compressing unit 1504, an encapsulating unit 1505, and a sending unit 1506, where:

the acquiring unit 1501 is configured to acquire a Medium Access Control protocol data unit MAC PDU that is obtained by decoding according to an Iub interface protocol;

the first decoding unit 1502 is configured to decode the MAC PDU according to the Medium Access Control Protocol MAC, the Radio Link Control Protocol RLC, and the Packet Data Convergence Protocol PDCP in sequence to obtain a Packet Data Convergence Protocol protocol data unit PDCP PDU;

the second decoding unit 1503 is configured to use a user data protocol header to decode the PDCP PDU to obtain decoded data;

the compressing unit 1504 is configured to compress the decoded data to obtain compressed data;

the encapsulating unit 1505 is configured to encapsulate the compressed data according to the user data protocol header, PDCP, RLC, and MAC to obtain Uu encapsulated data; and the sending unit 1506 is configured to send the Uu encapsulated data to a core network or a base station.

It should be noted that, the acquiring unit 1501 provided by this embodiment of the present invention, in a possible implementation manner, includes (not shown in FIG. 15):

a first decoding subunit, configured to decode received Iub encapsulated data according to the Iub interface protocol to obtain the MAC PDU;

or a receiving subunit, configured to receive the MAC PDU from a protocol processing module of the base station or a protocol processing module of a radio network controller RNC.

It should be noted that, the first decoding subunit provided by this embodiment of the present invention, in a possible implementation manner, includes (not shown in FIG. 15):

a fragment reassembly module, configured to: when the Iub encapsulated data is an IP data packet in which IP fragments exist, perform IP fragment reassembly for the IP data packet in which IP fragments exist, to acquire complete transmission network IP packet data;

a first decoding module, configured to decode the transmission network IP packet data according to the Internet Protocol IP and the User Datagram Protocol UDP to obtain a UDP payload; and a second decoding module, configured to decode the UDP payload according to the Frame Protocol FP to obtain the MAC PDU.

It should be noted that, the first decoding unit 1502 provided by this embodiment of the present invention, in another possible implementation manner, includes (not shown in FIG. 15):

a second decoding subunit, configured to decode the MAC PDU at a MAC layer to obtain an RLC PDU; and a decoding and assembly subunit, configured to decode the RLC PDU at an RLC layer, and then reassemble the decoded RLC PDU to obtain the PDCP PDU.

It should be noted that, the second decoding unit 1503 provided by this embodiment of the present invention, in another possible implementation manner, includes (not shown in FIG. 15):

a third decoding subunit, configured to perform upper layer protocol header decompression for the PDCP PDU to obtain user data IP packet data, where the user data IP packet data includes a user data IP protocol header and a user data transmission layer protocol header; and a fourth decoding subunit, configured to decode the user data IP protocol header and the user data transmission layer protocol header to obtain the decoded data.

It should be noted that, the data transmission device 1500 provided by this embodiment of the present invention, in another possible implementation manner, may further include (not shown in FIG. 15):

a first decrypting unit, configured to: after the second decoding subunit decodes the MAC PDU at the MAC layer, when data carried by the MAC PDU is encrypted, decrypt the data carried by the MAC PDU; and a second decrypting unit, configured to: after the decoding and assembly subunit decodes the RLC PDU at the RLC layer, when data carried by the RLC PDU is encrypted, decrypt the data carried by the RLC PDU.

It should be noted that, the compressing unit 1504 provided by this embodiment of the present invention, in a possible implementation manner, may further include (not shown in FIG. 15):

a segmenting subunit, a digest generating subunit, a codebook generating subunit, a codebook sending subunit, a determining subunit, a replacing subunit, and an encoding subunit, where:

the segmenting subunit is configured to segment the decoded data to obtain multiple decoded data segments;

the digest generating subunit is configured to generate a digital digest for each decoded data segment obtained after segmentation;

the codebook generating subunit is configured to generate a codebook, where the codebook includes each digital digest and each decoded data segment and an index structure of each digital digest and each decoded data segment;

the codebook sending subunit is configured to send the codebook to a decoding device that uses the codebook for decoding, where the subunit is an optional part in this embodiment;

the determining subunit is configured to determine, according to the codebook, whether duplicate decoded data segments exist;

the replacing subunit is configured to: when duplicate decoded data segments exist, use digital digests corresponding to the duplicate decoded data segments to replace the duplicate decoded data segments; and the encoding subunit is configured to encode non-duplicate decoded data segments and the digital digests corresponding to the duplicate decoded data segments to obtain the compressed data.

In this embodiment provided by the present invention, first an acquiring unit acquires a MAC PDU that is obtained by decoding according to an Iub interface protocol; then a first decoding unit decodes the MAC PDU according to MAC, RLC, and PDCP in sequence; a second decoding unit uses a user data protocol header to decode a PDCP PDU to obtain decoded data; a compressing unit compresses the decoded data to obtain compressed data; and then an encapsulating unit encapsulates the compressed data according to the user data protocol header, PDCP, RLC, and MAC in sequence to obtain Uu encapsulated data. In this optimization manner, compression of decoded data may be implemented, and a compression rate of data transmitted on a Backhaul may be increased to increase throughput of the Backhaul.

Figure 16:
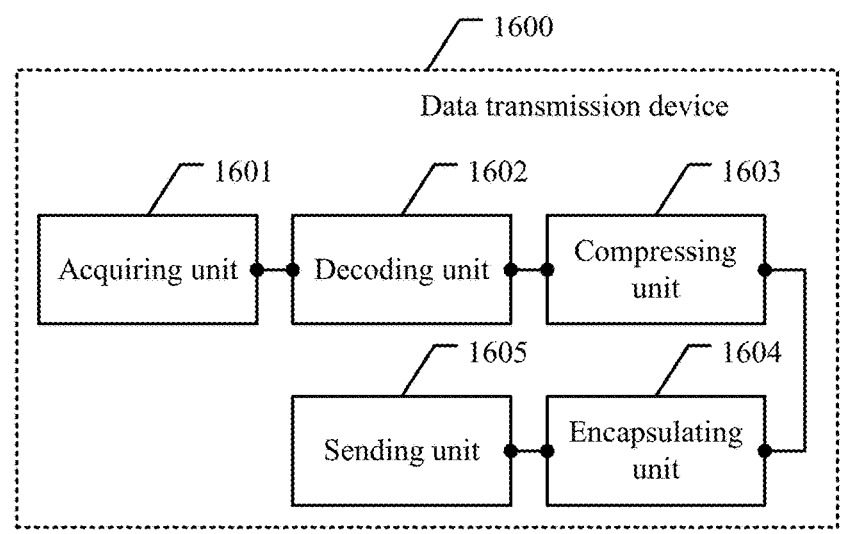
FIG. 16 is a schematic composition diagram of a structure of another data transmission device according to an embodiment of the present invention.

The following introduces another data transmission device provided by an embodiment of the present invention. As shown in FIG. 16, a data transmission device 1600 includes an acquiring unit 1601, a decoding unit 1602, a compressing unit 1603, an encapsulating unit 1604, and a sending unit 1605, where:

the acquiring unit 1601 is configured to acquire a Uu interface Medium Access Control protocol data unit MAC PDU that is obtained by decoding according to an Iub interface protocol;

the decoding unit 1602 is configured to decode the MAC PDU according to the Medium Access Control Protocol MAC and the Radio Link Control Protocol RLC in sequence to obtain decoded data;

the compressing unit 1603 is configured to compress the decoded data to obtain compressed data;

the encapsulating unit 1604 is configured to encapsulate the compressed data according to RLC and MAC in sequence to obtain Uu encapsulated data; and the sending unit 1605 is configured to send the Uu encapsulated data to a decoding device in a core network or in a base station.

It should be noted that, the decoding unit 1602 provided by this embodiment of the present invention, in a possible implementation manner, includes (not shown in FIG. 16):

a first decoding subunit, configured to decode the MAC PDU at a MAC layer to obtain an RLC PDU; and a second decoding subunit, configured to decode the RLC PDU at an RLC layer to obtain the decoded data.

It should be noted that, the compressing unit 1603 provided by this embodiment of the present invention, in a possible implementation manner, may further include (not shown in FIG. 16): a segmenting subunit, a digest generating subunit, a codebook generating subunit, a codebook sending subunit, a determining subunit, a replacing subunit, and an encoding subunit, where:

the segmenting subunit is configured to segment the decoded data to obtain multiple decoded data segments;

the digest generating subunit is configured to generate a digital digest for each decoded data segment obtained after segmentation;

the codebook generating subunit is configured to generate a codebook, where the codebook includes each digital digest and each decoded data segment and an index structure of each digital digest and each decoded data segment;

the codebook sending subunit is configured to send the codebook to a decoding device that uses the codebook for decoding;

the determining subunit is configured to determine, according to the codebook, whether duplicate decoded data segments exist;

the replacing subunit is configured to: when duplicate decoded data segments exist, use digital digests corresponding to the duplicate decoded data segments to replace the duplicate decoded data segments; and the encoding subunit is configured to encode non-duplicate decoded data segments and the digital digests corresponding to the duplicate decoded data segments to obtain the compressed data.

In this embodiment provided by the present invention, first an acquiring unit acquires a MAC PDU that is obtained by decoding according to an Iub interface protocol; then a decoding unit decodes the MAC PDU according to MAC and RLC in sequence to obtain decoded data; a compressing unit compresses the decoded data to obtain compressed data; and then an encapsulating unit encapsulates the compressed data according to RLC and MAC in sequence to obtain Uu encapsulated data. In this optimization manner, compression of decoded data may be implemented, and a compression rate of data transmitted on a Backhaul may be increased to increase throughput of the Backhaul.

Figure 17:
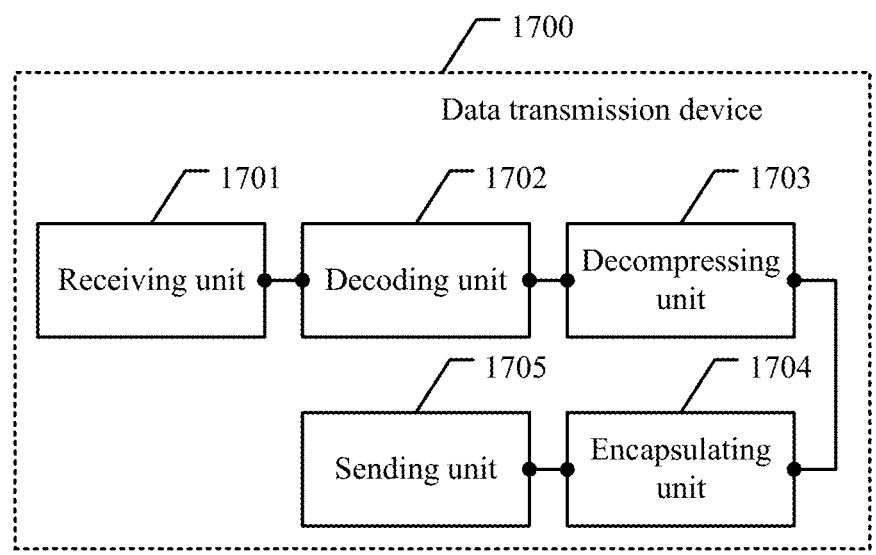
FIG. 17 is a schematic composition diagram of a structure of another data transmission device according to an embodiment of the present invention.

The foregoing embodiment introduces a data transmission device located at one end of a backhaul link and configured to implement de-duplication of transmitted data during a complete data transmission process. The following introduces a data transmission device located at the other end of the backhaul link and configured to implement restoration of the transmitted data. Referring to FIG. 17, an embodiment of the present invention provides a data transmission device 1700. A data restoration method implemented by the data transmission device shown in FIG. 17 is corresponding to the data compression method implemented by the data transmission device shown in FIG. 13. As shown in FIG. 17, the data transmission device 1700 may specifically include a receiving unit 1701, a decoding unit 1702, a decompressing unit 1703, an encapsulating 1704, and a sending unit 1705, where:

the receiving unit 1701 is configured to receive a compressed Internet Protocol IP data packet;

the decoding unit 1702 is configured to decode the compressed IP data packet according to a transmission network protocol header to obtain a compressed transmission network protocol payload;

the decompressing unit 1703 is configured to decompress the compressed transmission network protocol payload to obtain a transmission tunneling protocol header, a user data protocol header, and user application layer data in sequence;

the encapsulating unit 1704 is configured to use the transmission network protocol header to encapsulate the transmission tunneling protocol header, the user data protocol header, and the user application layer data to obtain an IP data packet; and the sending unit 1705 is configured to send the IP data packet to a core network or a base station.

It should be noted that, the decompressing unit 1703 provided by this embodiment of the present invention, in a possible implementation manner, includes (not shown in FIG. 17):

a first decompressing subunit, configured to perform header decompression for the compressed transmission network protocol payload according to the transmission tunneling protocol header and the user data protocol header in sequence to obtain a decompressed transmission tunneling protocol header, a decompressed user data protocol header, and compressed user application layer data; and a second decompressing subunit, configured to decompress the compressed user application layer data to obtain the user application layer data.

It should be noted that, the decoding unit 1702 provided by this embodiment of the present invention, in a possible implementation manner, includes (not shown in FIG. 17):

a parsing subunit, configured to parse the compressed IP data packet to acquire a length of a transmission network IP protocol header and a corresponding field;

a first acquiring subunit, configured to acquire a length of a transmission network transmission layer protocol header according to the length of the transmission network IP protocol header and the corresponding field;

a second acquiring subunit, configured to acquire a length of the transmission network protocol header according to the length of the transmission network IP protocol header and the length of the transmission network transmission layer protocol header, where the length of the transmission network protocol header is the length of the transmission network IP protocol header plus the length of the transmission network transmission layer protocol header; and a third acquiring subunit, configured to remove data from a beginning of the compressed IP data packet and corresponding to a length that is the length of the transmission network protocol header, to obtain the compressed transmission network protocol payload.

In this embodiment provided by the present invention, after a receiving unit receives a compressed IP data packet, a decoding unit decodes the compressed IP data packet according to a transmission network protocol header to obtain a compressed transmission network protocol payload; a decompressing unit decompresses the compressed transmission network protocol payload to obtain a transmission tunneling protocol header, a user data protocol header, and user application layer data; and finally an encapsulating unit uses the transmission network protocol header to encapsulate the transmission tunneling protocol header, the user data protocol header, and the user application layer data to obtain an IP data packet. In this implementation manner, restoration of a compressed IP data packet is implemented to obtain an IP data packet, and restoration of a compressed data packet transmitted on a transmission link is implemented, and therefore throughput of a Backhaul may be increased.

Figure 18:
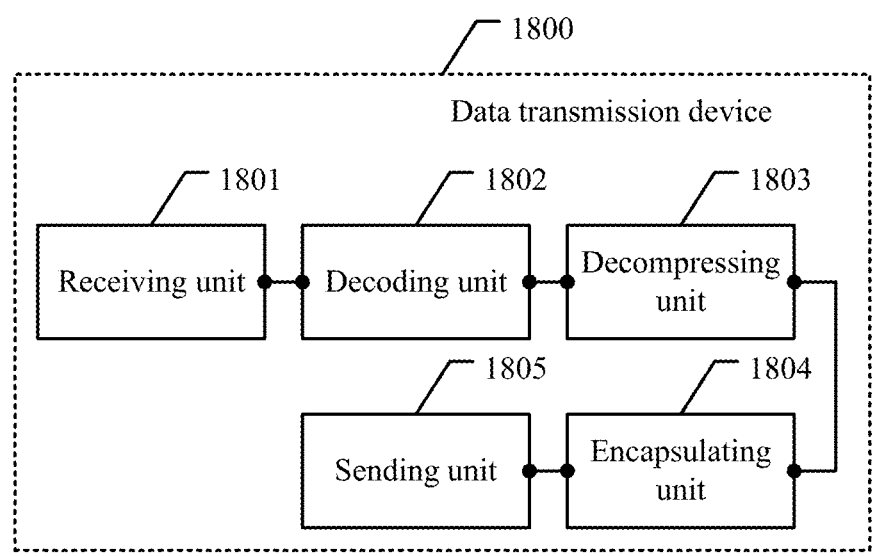
FIG. 18 is a schematic composition diagram of a structure of another data transmission device according to an embodiment of the present invention.

The following introduces a data transmission device located at the other end of the backhaul link and configured to implement restoration of transmitted data. Referring to FIG. 18, an embodiment of the present invention provides a data transmission device 1800. A data restoration method implemented by the data transmission device shown in FIG. 18 is corresponding to the data compression method implemented by the data transmission device shown in FIG. 14. As shown in FIG. 18, the data transmission device 1800 may specifically include a receiving unit 1801, a decoding unit 1802, a decompressing unit 1803, an encapsulating 1804, and a sending unit 1805, where:

the receiving unit 1801 is configured to receive a compressed Internet Protocol IP data packet;

the decoding unit 1802 is configured to decode the compressed IP data packet according to a transmission network protocol header, a transmission tunneling protocol header, and a user data protocol header to obtain a compressed user data protocol payload;

the decompressing unit 1803 is configured to decompress the compressed user data protocol payload to obtain user application layer data;

the encapsulating unit 1804 is configured to use the transmission network protocol header, the transmission tunneling protocol header, and the user data protocol header to encapsulate the user application layer data to obtain an IP data packet; and the sending unit 1805 is configured to send the IP data packet to a core network or a base station.

It should be noted that, the decompressing unit 1803 provided by this embodiment of the present invention, in a possible implementation manner, includes (not shown in FIG. 18):

a receiving subunit, configured to receive a codebook sent by an encoding device, where the codebook includes each digital digest and each user application layer data segment and an index structure of each digital digest and each user application layer data segment;

a determining subunit, configured to determine, according to the codebook, whether duplicate user application layer data segments exist in the compressed user data protocol payload;

a decoding subunit, configured to: when duplicate user application layer data segments exist, decode the compressed user data protocol payload to obtain non-duplicate user application layer data segments and digital digests corresponding to the duplicate user application layer data segments;

a restoring subunit, configured to restore the digital digests corresponding to the duplicate user application layer data segments that are obtained by decoding, to the duplicate user application layer data segments; and an assembling subunit, configured to assemble the duplicate user application layer data segments and the non-duplicate user application layer data segments to obtain the user application layer data.

In this embodiment provided by the present invention, after receiving a compressed IP data packet, a data transmission device decodes the compressed IP data packet according to a transmission network protocol header, a transmission tunneling protocol header, and a user data protocol header to obtain a compressed user data protocol payload; then decompresses the compressed user data protocol payload to obtain user application layer data; and then encapsulates the user application layer data according to the user data protocol header, the transmission tunneling protocol header, and the transmission network protocol header to obtain an IP data packet. In this implementation manner, restoration of a compressed IP data packet is implemented to obtain an IP data packet, and restoration of a compressed data packet transmitted on a transmission link is implemented, and therefore throughput of a Backhaul may be increased.

Figure 19:
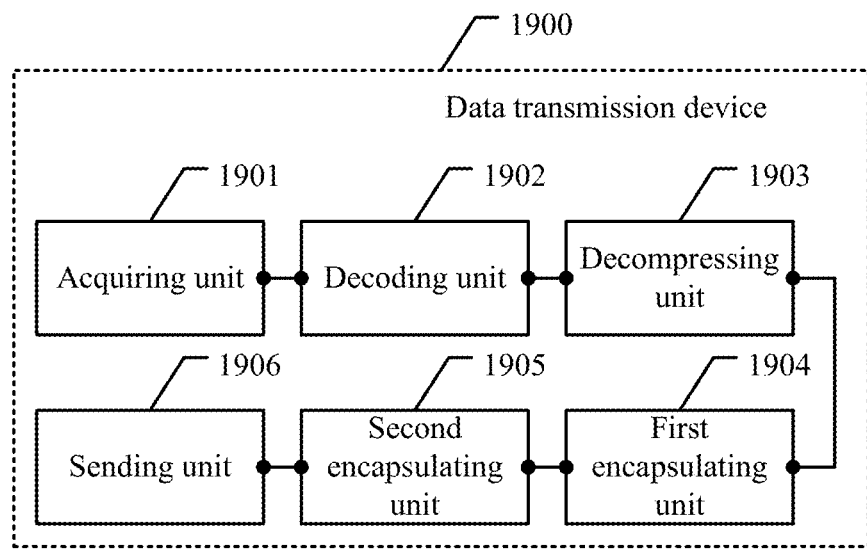
FIG. 19 is a schematic composition diagram of a structure of another data transmission device according to an embodiment of the present invention.

The following introduces another data transmission device provided by an embodiment of the present invention. Referring to FIG. 19, an embodiment of the present invention provides a data transmission device 1900. A data restoration method implemented by the data transmission device shown in FIG. 19 is corresponding to the data compression method implemented by the data transmission device shown in FIG. 15. As shown in FIG. 19, the data transmission device 1900 may specifically include an acquiring unit 1901, a decoding unit 1902, a decompressing unit 1903, a first encapsulating 1904, a second encapsulating unit 1905, and a sending unit 1906, where:

the acquiring unit 1901 is configured to acquire Uu encapsulated data;

the decoding unit 1902 is configured to decode the Uu encapsulated data according to the Medium Access Control Protocol MAC, the Radio Link Control Protocol RLC, the Packet Data Convergence Protocol PDCP, and a user data protocol header in sequence to obtain compressed data;

the decompressing unit 1903 is configured to decompress the compressed data to obtain decoded data;

the first encapsulating unit 1904 is configured to encapsulate the decoded data according to the user data protocol header to obtain a Packet Data Convergence Protocol protocol data unit PDCP PDU;

the second encapsulating unit 1905 is configured to encapsulate the PDCP PDU according to PDCP, RLC, and MAC in sequence to obtain a Uu interface Medium Access Control protocol data unit MAC PDU; and the sending unit 1906 is configured to send the MAC PDU to a core network or a base station.

It should be noted that, the decompressing unit 1903 provided by this embodiment of the present invention, in a possible implementation manner, may further include (not shown in FIG. 19):

a receiving subunit, configured to receive a codebook sent by an encoding device, where the codebook includes each digital digest and each decoded data segment and an index structure of each digital digest and each decoded data segment;

a determining subunit, configured to determine, according to the codebook, whether duplicate decoded data segments exist in the compressed data;

a decoding subunit, configured to: when duplicate decoded data segments exist, decode the compressed data to obtain non-duplicate decoded data segments and digital digests corresponding to the duplicate decoded data segments;

a restoring subunit, configured to restore the digital digests corresponding to the duplicate decoded data segments that are obtained by decoding, to the duplicate decoded data segments; and an assembling subunit, configured to assemble the duplicate decoded data segments and the non-duplicate decoded data segments to obtain the decoded data.

In this embodiment provided by the present invention, a data transmission device first acquires Uu encapsulated data; decodes the Uu encapsulated data according to MAC, RLC, PDCP, and a user data protocol header in sequence to obtain compressed data; decompresses the compressed data to obtain decoded data; and finally encapsulates the decoded data by using the user data protocol header, PDCP, RLC, and MAC to obtain a MAC PDU. Because Uu encapsulated data is restored to a MAC PDU, compression of data transmitted on a Backhaul may be implemented to increase throughput of the Backhaul.

Figure 20:
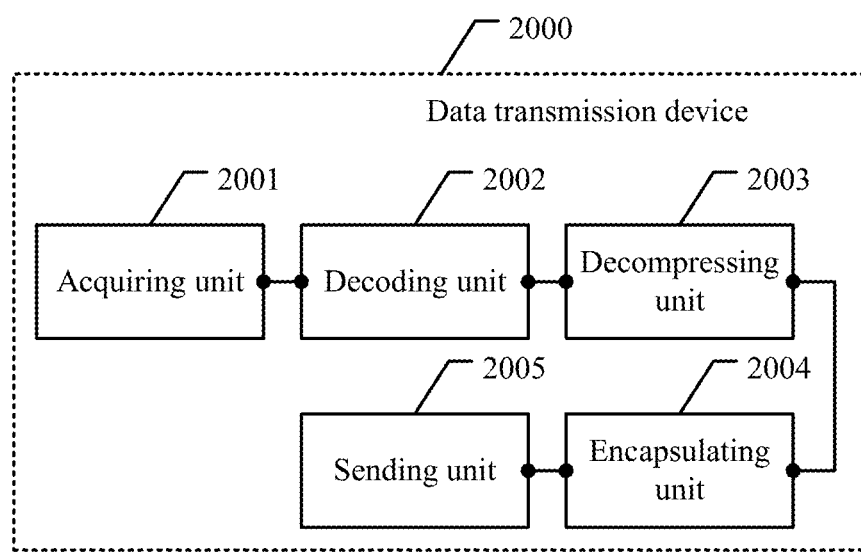
FIG. 20 is a schematic composition diagram of a structure of another data transmission device according to an embodiment of the present invention.

The following introduces another data transmission device provided by an embodiment of the present invention. Referring to FIG. 20, an embodiment of the present invention provides a data transmission device 2000. A data restoration method implemented by the data transmission device shown in FIG. 20 is corresponding to the data compression method implemented by the data transmission device shown in FIG. 16. As shown in FIG. 20, the data transmission device 2000 may specifically include an acquiring unit 2001, a decoding unit 2002, a decompressing unit 2003, an encapsulating 2004, and a sending unit 2005, where:

the acquiring unit 2001 is configured to acquire Uu encapsulated data;

the decoding unit 2002 is configured to decode the Uu encapsulated data according to the Medium Access Control Protocol MAC and the Radio Link Control Protocol RLC in sequence to obtain compressed data;

the decompressing unit 2003 is configured to decompress the compressed data to obtain decoded data;

the encapsulating unit 2004 is configured to encapsulate the decoded data according to RLC and MAC to obtain a Uu interface Medium Access Control protocol data unit MAC PDU; and the sending unit 2005 is configured to send the MAC PDU to a core network or a base station.

It should be noted that, the decompressing unit 2003 provided by this embodiment of the present invention, in a possible implementation manner, may further include (not shown in FIG. 20):

a receiving subunit, configured to receive a codebook sent by an encoding device, where the codebook includes each digital digest and each decoded data segment and an index structure of each digital digest and each decoded data segment;

a determining subunit, configured to determine, according to the codebook, whether duplicate decoded data segments exist in the compressed data;

a decoding subunit, configured to: when duplicate decoded data segments exist, decode the compressed data to obtain non-duplicate decoded data segments and digital digests corresponding to the duplicate decoded data segments;

a restoring subunit, configured to restore the digital digests corresponding to the duplicate decoded data segments that are obtained by decoding, to the duplicate decoded data segments; and an assembling subunit, configured to assemble the duplicate decoded data segments and the non-duplicate decoded data segments to obtain the decoded data.

In this embodiment provided by the present invention, a data transmission device first acquires encapsulated data, and the data transmission device decodes the encapsulated data according to MAC and RLC in sequence to obtain compressed data, then decompresses the compressed data to obtain decoded data, and finally uses RLC and MAC to encapsulate the decoded data to obtain a MAC PDU. Because Uu encapsulated data is restored to a MAC PDU, compression of data transmitted on a Backhaul may be implemented to increase throughput of the Backhaul.

Figure 21:
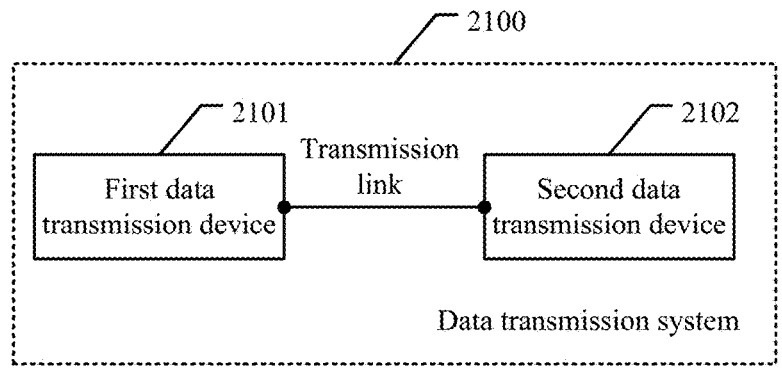
FIG. 21 is a schematic composition diagram of a structure of a data transmission system according to an embodiment of the present invention.

Reference may be made to a data transmission system provided by an embodiment of the present invention in the following. As shown in FIG. 21, a data transmission system 2100 includes a first data transmission device 2101 and a second data transmission device 2102, where:

the first data transmission device 2101 is connected to the second data transmission device 2102 by using a transmission link;

the first data transmission device 2101 is the data transmission device 1300 shown in FIG. 13, and the second data transmission device 2102 is the data transmission device 1700 shown in FIG. 17; the first data transmission device 2101 is an encoding device; the first data transmission device 2101 transmits a compressed IP data packet obtained by compression to the second data transmission device 2102 through the transmission link; and the second data transmission device 2102 is a decoding device in a core network or in a base station.

Reference may be made to another data transmission system provided by an embodiment of the present invention. The data transmission system includes a first data transmission device and a second data transmission device, where:

the first data transmission device is connected to the second data transmission device by using a transmission link;

the first data transmission device is the data transmission device 1400 shown in FIG. 14, and the second data transmission device is the data transmission device 1800 shown in FIG. 18; the first data transmission device is an encoding device; the first data transmission device transmits a compressed IP data packet obtained by compression to the second data transmission device through the transmission link; and the second data transmission device is a decoding device in a core network or in a base station.

Reference may be made to another data transmission system provided by an embodiment of the present invention. The data transmission system includes a first data transmission device and a second data transmission device, where:

the first data transmission device is connected to the second data transmission device by using a transmission link;

the first data transmission device is the data transmission device 1500 shown in FIG. 15, and the second data transmission device is the data transmission device 1900 shown in FIG. 19; the first data transmission device is an encoding device; the first data transmission device transmits Uu encapsulated data to the second data transmission device through the transmission link; and the second data transmission device is a decoding device in a core network or in a base station.

Reference may be made to another data transmission system provided by an embodiment of the present invention. The data transmission system includes a first data transmission device and a second data transmission device, where:

the first data transmission device is connected to the second data transmission device b using a transmission link;

the first data transmission device is the data transmission device 1600 shown in FIG. 16, and the second data transmission device is the data transmission device 2000 shown in FIG. 20; the first data transmission device is an encoding device; the first data transmission device transmits Uu encapsulated data to the second data transmission device through the transmission link; and the second data transmission device is a decoding device in a core network or in a base station.

For example, the first data transmission device 2101 shown in the foregoing embodiment in FIG. 13 and the second data transmission device 2102 shown in the foregoing embodiment in FIG. 17, or the first data transmission device shown in the foregoing embodiment in FIG. 14 and the second data transmission device shown in the foregoing embodiment in FIG. 18.

Figure 22:
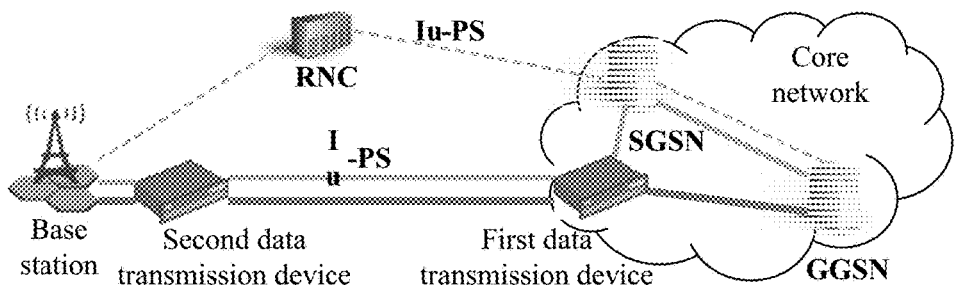
FIG. 22 is a schematic diagram of an application scenario of a data transmission system according to an embodiment of the present invention.

Specifically, the second data transmission device is connected to a base station, the first data transmission device is connected to a gateway General Packet Radio Service technology support node GGSN, and/or the second data transmission device is connected to a serving General Packet Radio Service technology support node SGSN; and the transmission link is an Iub and/or Iu-PS interface link. FIG. 22 shows a case in which the transmission link is an Iu-PS interface link.

Figure 23:
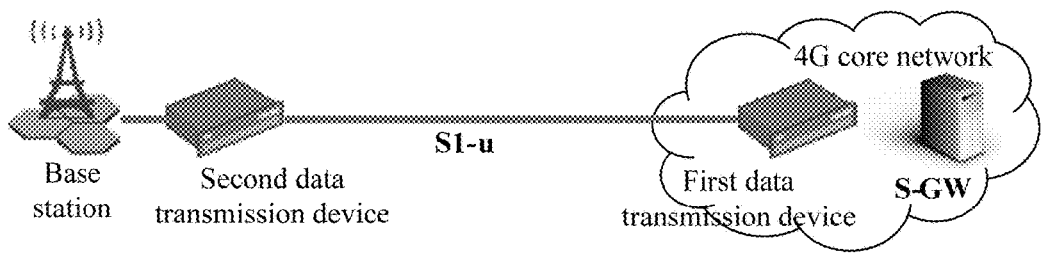
FIG. 23 is a schematic diagram of another application scenario of a data transmission system according to an embodiment of the present invention.

Specifically, the second data transmission device is connected to a base station; the first data transmission device is connected to a serving gateway S-GW; and the transmission link is an S1-u interface link, as shown in FIG. 23.

Figure 24:
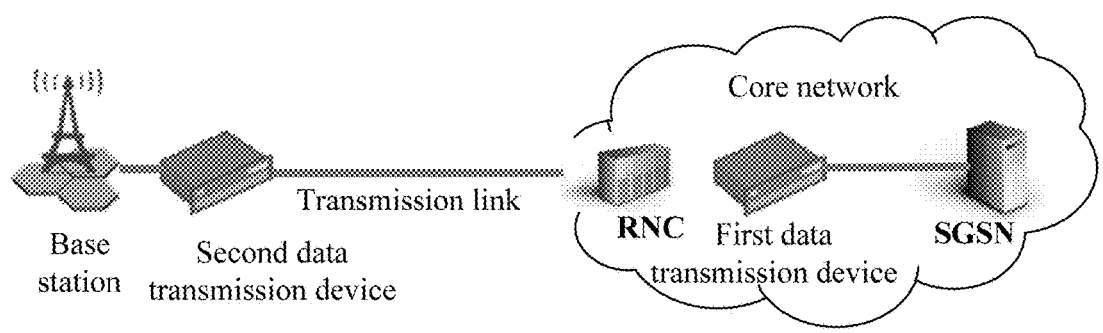
FIG. 24 is a schematic diagram of another application scenario of a data transmission system according to an embodiment of the present invention.

Specifically, the second data transmission device is connected to a base station or the second data transmission device is integrated into a base station; the first data transmission device is connected to a radio network controller RNC or the first data transmission device is integrated into an RNC; and the RNC is connected to the first data transmission device by using the transmission link, as shown in FIG. 24.

Figure 25:
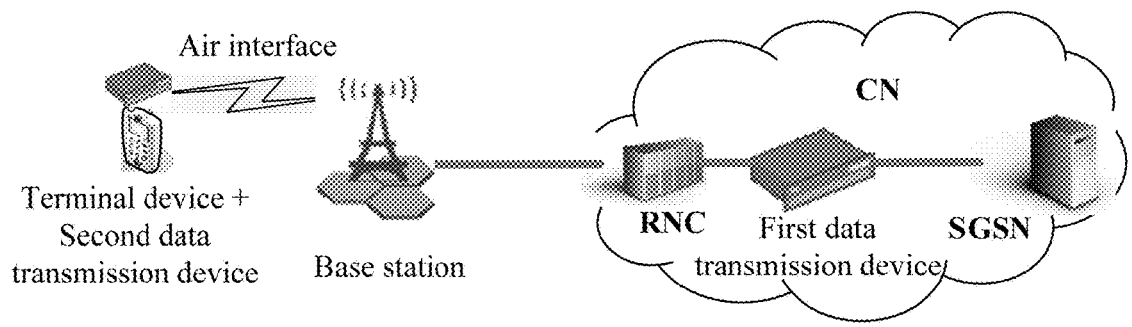
FIG. 25 is a schematic diagram of another application scenario of a data transmission system according to an embodiment of the present invention.

Specifically, the first data transmission device is connected to a radio network controller RNC, or the first data transmission device is integrated into an RNC; the second data transmission device is integrated into a terminal device; and the terminal device is connected to the base station by using an air interface, as shown in FIG. 25.

It should be noted that, node devices such as a switch and a router may be installed on the transmission link described in this embodiment of the present invention. The transmission link described in this embodiment of the present invention includes but is not limited to a radio link or a wired link, a direct link, or a link that is connected by using a switch, a router, or other network elements.

It should be noted that, content such as information exchange between the modules/units of the foregoing apparatus and the execution processes thereof is based on the same idea as the method embodiments of the present invention, and produces the same technical effects as the method embodiments of the present invention. For the specific content, refer to the description in the method embodiments of the present invention, and the details are not described herein again.

In the embodiments provided by the present invention, a first data transmission device parses a received IP data packet to acquire a compressed IP data packet, and then sends the compressed IP data packet to a second data transmission device; the second data transmission device performs restoration. Both the two implementation manners may compress user data in a radio network, and compression of data transmitted on a Backhaul may be implemented to increase throughput of the Backhaul.

The first data transmission device acquires a MAC PDU obtained by decoding according to an Iub interface protocol, acquires Uu encapsulated data, and then sends the Uu encapsulated data to the second data transmission device; the second data transmission device performs restoration. Both the two implementation manners may compress user data in a radio network, and compression of data transmitted on a Backhaul may be implemented to increase throughput of the Backhaul.

A person of ordinary skill in the art may understand that all or some of the steps of the methods in the embodiments may be implemented by a program instructing relevant hardware. The program may be stored in a computer readable storage medium. The storage medium may include: a read-only memory, a magnetic disk, or an optical disc.

A data transmission method and a related apparatus provided by the present invention are described in detail above. A person skilled in the art can make various modifications and variations with respect to specific implementation manners and application scopes according to ideas of the embodiments of the present invention. Therefore, content of the specification shall not be construed as a limitation on the present invention.

What is claimed is:

1. A data transmission method performed by a data transmission device for compressing data to be transmitted on a network, the method comprising:
    parsing a received Internet Protocol (IP) data packet to obtain a transmission network protocol header, a transmission tunneling protocol header, a user data protocol header, and user application layer data;
    compressing the transmission tunneling protocol header, the user data protocol header, and the user application layer data to obtain a compressed transmission network protocol payload;
    using the transmission network protocol header to encapsulate the compressed transmission network protocol payload to obtain a compressed IP data packet;
    sending the compressed IP data packet to a core network or a base station;
    wherein the transmission network protocol header comprises a transmission network IP protocol header and a transmission network transmission layer protocol header; and
    parsing a received Internet Protocol (IP) data packet to obtain a transmission network protocol header comprises:
        acquiring complete transmission network IP packet data,
        determining the transmission network IP protocol header and a length of the transmission network IP protocol header according to a header of the transmission network IP packet data,
        determining a protocol type of a transmission network transmission layer protocol according to a protocol type field in the header of the transmission network IP packet data, and then determining the transmission network transmission layer protocol header and a length of the transmission network transmission layer protocol header according to the protocol type of the transmission network transmission layer protocol,
        acquiring a length of the transmission network protocol header according to the transmission network IP protocol header and the transmission network transmission layer protocol header, wherein the length of the transmission network protocol header is the length of the transmission network IP protocol header plus the length of the transmission network transmission layer protocol header, and
        acquiring the transmission network protocol header according to the transmission network IP packet data and the length of the transmission network protocol header.

2. The method according to claim 1, wherein compressing the transmission tunneling protocol header, the user data protocol header, and the user application layer data to obtain a compressed transmission network protocol payload comprises:
    performing header compression for the transmission tunneling protocol header and the user data protocol header to obtain a first result of header compression;
    compressing the user application layer data to obtain compressed user application layer data; and
    encoding the first result of header compression and the compressed user application layer data to obtain the compressed transmission network protocol payload.

3. A data transmission method performed by a data transmission device for compressing data to be transmitted on a network, the method comprising:
    parsing a received Internet Protocol (IP) data packet to obtain a transmission network protocol header, a transmission tunneling protocol header, a user data protocol header, and user application layer data;
    compressing the transmission tunneling protocol header, the user data protocol header, and the user application layer data to obtain a compressed transmission network protocol payload;
    using the transmission network protocol header to encapsulate the compressed transmission network protocol payload to obtain a compressed IP data packet;
    wherein parsing a received Internet Protocol (IP) data packet to obtain a transmission tunneling protocol header comprises:
        obtaining a protocol type of a transmission tunneling protocol, and calculating a length of a fixed header of the transmission tunneling protocol according to the protocol type of the transmission tunneling protocol;

determining, according to the protocol type of the transmission tunneling protocol, whether any optional field exists in the transmission tunneling protocol header;

if no optional field exists, determining a length of the transmission tunneling protocol header according to the length of the fixed header of the transmission tunneling protocol, wherein the length of the transmission tunneling protocol header is the length of the fixed header of the transmission tunneling protocol;

if an optional field exists, determining, according to a field corresponding to the protocol type of the transmission tunneling protocol, whether any extension header exists in the transmission tunneling protocol header, and if an optional field exists but no extension header exists, determining the length of the transmission tunneling protocol header according to the length of the fixed header of the transmission tunneling protocol and a length of the optional field, wherein the length of the transmission tunneling protocol header is the length of the fixed header of the transmission tunneling protocol plus the length of the optional field, or if an optional field exists and an extension header exists, determining the length of the transmission tunneling protocol header according to the length of the fixed header of the transmission tunneling protocol, a length of the optional field, and a length of the extension header, wherein the length of the transmission tunneling protocol header is the length of the fixed header of the transmission tunneling protocol plus the length of the optional field plus the length of the extension header; and determining the transmission tunneling protocol header according to the transmission network IP packet data and the length of the transmission tunneling protocol header.

4. A data transmission method performed by a data transmission device for compressing data to be transmitted on a network, the method comprising:

parsing a received Internet Protocol (IP) data packet to obtain a transmission network protocol header, a transmission tunneling protocol header, a user data protocol header, and user application layer data;

compressing the transmission tunneling protocol header, the user data protocol header, and the user application layer data to obtain a compressed transmission network protocol payload;

using the transmission network protocol header to encapsulate the compressed transmission network protocol payload to obtain a compressed IP data packet;

wherein the user data protocol header comprises a length of a user data IP protocol header and a user data transmission layer protocol header; and parsing a received Internet Protocol (IP) data packet to obtain a user data protocol header comprises:

acquiring complete user data IP packet data, acquiring the length of the user data IP protocol header according to a header of the user data IP packet data, determining a protocol type of a user data transmission layer protocol according to a protocol type field in the header of the user data IP packet data, acquiring the user data transmission layer protocol header according to the protocol type of the user data transmission layer protocol, and acquiring a length of the user data transmission layer protocol header according to the user data transmission layer protocol header, acquiring a length of the user data protocol header according to the length of the user data IP protocol header and the length of the user data transmission layer protocol header, wherein the length of the user data protocol header is the length of the user data IP protocol header plus the length of the user data transmission layer protocol header, and acquiring the user data protocol header according to the transmission network IP packet data and the length of the user data protocol header.

5. A data transmission method performed by a data transmission device for compressing data to be transmitted on a network, the method comprising:

parsing a received Internet Protocol (IP) data packet to obtain a transmission network protocol header, a transmission tunneling protocol header, a user data protocol header, and user application layer data;

compressing the transmission tunneling protocol header, the user data protocol header, and the user application layer data to obtain a compressed transmission network protocol payload;

using the transmission network protocol header to encapsulate the compressed transmission network protocol payload to obtain a compressed IP data packet;

wherein after using the transmission network protocol header to encapsulate the compressed transmission network protocol payload to obtain a compressed IP data packet, the method further comprises:

determining whether a length of the compressed IP data packet is greater than a length of a maximum transmission unit of a lower layer protocol, and when the length of the compressed IP data packet is greater than the length of the maximum transmission unit of the lower layer protocol, performing IP fragmentation for the compressed IP data packet to obtain compressed IP data packet fragments, wherein the lower layer protocol comprises a protocol directly used to transmit the compressed IP data packet; and sending the compressed IP data packet to a core network or a base station comprises:

sending the compressed IP data packet fragments to the core network or the base station.

6. A data transmission method performed by a data transmission device for compressing data to be transmitted on a network, the method comprising:

parsing a received Internet Protocol (IP) data packet to obtain a transmission network protocol header, a transmission tunneling protocol header, a user data protocol header, and user application layer data;

compressing the user application layer data to obtain a compressed user data protocol payload;

using the user data protocol header, the transmission tunneling protocol header, and the transmission network protocol header to encapsulate the compressed user data protocol payload to obtain a compressed IP data packet;

sending the compressed IP data packet to a core network or a base station;

wherein the transmission network protocol header comprises a transmission network IP protocol header and a transmission network transmission layer protocol header; and parsing a received Internet Protocol (IP) data packet to obtain a transmission network protocol header comprises:

acquiring complete transmission network IP packet data, acquiring the transmission network IP protocol header and a length of the transmission network IP protocol header according to a header of the transmission network IP packet data, determining a protocol type of a transmission network transmission layer protocol according to a protocol type field in the header of the transmission network IP packet data, and then acquiring the transmission network transmission layer protocol header and a corresponding field according to the protocol type of the transmission network transmission layer protocol, and acquiring a length of the transmission network transmission layer protocol header according to the transmission network transmission layer protocol header and the corresponding field, acquiring a length of the transmission network protocol header according to the transmission network IP protocol header and the transmission network transmission layer protocol header, wherein the length of the transmission network protocol header is the length of the transmission network IP protocol header plus the length of the transmission network transmission layer protocol header, and acquiring the transmission network protocol header according to the transmission network IP packet data and the length of the transmission network protocol header, wherein the transmission network protocol header is data from a beginning of the transmission network IP packet data and corresponding to a length that is the length of the transmission network protocol header.

7. The method according to claim 6, wherein:
the user data protocol header comprises a length of a user data IP protocol header and a user data transmission layer protocol header; and
parsing a received Internet Protocol (IP) data packet to obtain a user data protocol header comprises:
acquiring complete user data IP packet data,
acquiring the length of the user data IP protocol header according to a header of the user data IP packet data,
determining a protocol type of a user data transmission layer protocol according to a protocol type field in the header of the user data IP packet data, acquiring the user data transmission layer protocol header according to the protocol type of the user data transmission layer protocol, and acquiring a length of the user data transmission layer protocol header according to the user data transmission layer protocol header,
acquiring a length of the user data protocol header according to the length of the user data IP protocol header and the length of the user data transmission layer protocol header, wherein the length of the user data protocol header is the length of the user data IP protocol header plus the length of the user data transmission layer protocol header, and
acquiring the user data protocol header according to the transmission network IP packet data and the length of the user data protocol header.

8. A data transmission method performed by a data transmission device for compressing data to be transmitted on a network, the method comprising:
parsing a received Internet Protocol (IP) data packet to obtain a transmission network protocol header, a transmission tunneling protocol header, a user data protocol header, and user application layer data;
compressing the user application layer data to obtain a compressed user data protocol payload;
using the user data protocol header, the transmission tunneling protocol header, and the transmission network protocol header to encapsulate the compressed user data protocol payload to obtain a compressed IP data packet;
wherein parsing a received Internet Protocol (IP) data packet to obtain a transmission tunneling protocol header comprises:
obtaining a protocol type of a transmission tunneling protocol, and calculating a length of a fixed header of the transmission tunneling protocol according to the protocol type of the transmission tunneling protocol;
determining, according to the protocol type of the transmission tunneling protocol, whether any optional field exists in the transmission tunneling protocol header;
if no optional field exists, determining a length of the transmission tunneling protocol header according to the length of the fixed header of the transmission tunneling protocol, wherein the length of the transmission tunneling protocol header is the length of the fixed header of the transmission tunneling protocol;
if an optional field exists, determining, according to a field corresponding to the protocol type of the transmission tunneling protocol, whether any extension header exists in the transmission tunneling protocol header, and if an optional field exists but no extension header exists, determining the length of the transmission tunneling protocol header according to the length of the fixed header of the transmission tunneling protocol and a length of the optional field, wherein the length of the transmission tunneling protocol header is the length of the fixed header of the transmission tunneling protocol plus the length of the optional field, or if an optional field exists and an extension header exists, determining the length of the transmission tunneling protocol header according to the length of the fixed header of the transmission tunneling protocol, a length of the optional field, and a length of the extension header, wherein the length of the transmission tunneling protocol header is the length of the fixed header of the transmission tunneling protocol plus the length of the optional field plus the length of the extension header; and
acquiring the transmission tunneling protocol header according to the transmission network IP packet data and the length of the transmission tunneling protocol header.

9. A data transmission method performed by a data transmission device for compressing data to be transmitted on a network, the method comprising:
parsing a received Internet Protocol (IP) data packet to obtain a transmission network protocol header, a transmission tunneling protocol header, a user data protocol header, and user application layer data;
compressing the user application layer data to obtain a compressed user data protocol payload;
using the user data protocol header, the transmission tunneling protocol header, and the transmission network protocol header to encapsulate the compressed user data protocol payload to obtain a compressed IP data packet;
wherein compressing the user application layer data to obtain a compressed user data protocol payload comprises:

determining whether the user data transmission layer protocol is the Transmission Control Protocol (TCP), and when the user data transmission layer protocol is TCP, acquiring the user application layer data, wherein the user application layer data is a data payload after TCP session reassembly;

segmenting the user application layer data to obtain multiple user application layer data segments;

generating a digital digest for each user application layer data segment obtained after segmentation;

generating a codebook according to the user application layer data and the digital digests, wherein the codebook comprises each digital digest and each user application layer data segment and an index structure of each digital digest and each user application layer data segment;

determining, according to the codebook, whether duplicate user application layer data segments exist in the multiple user application layer data segments, and when duplicate user application layer data segments exist in the multiple user application layer data segments, using digital digests corresponding to the duplicate user application layer data segments to replace the duplicate user application layer data segments; and encoding non-duplicate user application layer data segments and the digital digests corresponding to the duplicate user application layer data segments to obtain the compressed user data protocol payload.

10. A data transmission device, comprising:

a processor;

memory coupled to the processor, the memory comprising instructions that, when executed by the processor, cause the data transmission device to:

parse a received IP data packet to obtain a transmission network protocol header, a transmission tunneling protocol header, a user data protocol header, and user application layer data, wherein the transmission network protocol header comprises a transmission network IP protocol header and a transmission network transmission layer protocol header, compress the transmission tunneling protocol header, the user data protocol header, and the user application layer data to obtain a compressed transmission network protocol payload, use the transmission network protocol header to encapsulate the compressed transmission network protocol payload to obtain a compressed IP data packet, send the compressed IP data packet to a core network or a base station, when IP fragments exist in the IP data packet, perform IP fragment reassembly for the IP data packet in which IP fragments exist, to acquire complete transmission network IP packet data, determine the transmission network IP protocol header and a length of the transmission network IP protocol header according to a header of the transmission network IP packet data, determine a protocol type of a transmission network transmission layer protocol according to a protocol type field in the header of the transmission network IP packet data, and then determine the transmission network transmission layer protocol header and a length of the transmission network transmission layer protocol header according to the protocol type of the transmission network transmission layer protocol, acquire a length of the transmission network protocol header according to the length of the transmission network IP protocol header and the length of the transmission network transmission layer protocol header, wherein the length of the transmission network protocol header is the length of the transmission network IP protocol header plus the length of the transmission network transmission layer protocol header, and acquire the transmission network protocol header according to the transmission network IP packet data and the length of the transmission network protocol header.

11. The data transmission device according to claim 10, wherein the memory further comprises instructions that, when executed by the processor, cause the data transmission device to:

calculate a length of a fixed header of a transmission tunneling protocol according to a protocol type of the transmission tunneling protocol;

determine, according to the protocol type of the transmission tunneling protocol, whether any optional field exists in the transmission tunneling protocol header;

when no optional field exists, acquire a length of the transmission tunneling protocol header according to the length of the fixed header of the transmission tunneling protocol, wherein the length of the transmission tunneling protocol header is the length of the fixed header of the transmission tunneling protocol;

when an optional field exists, determine, according to the protocol type of the transmission tunneling protocol, whether any extension header exists in the transmission tunneling protocol header;

when no extension header exists, determine the length of the transmission tunneling protocol header according to the length of the fixed header of the transmission tunneling protocol and a length of the optional field, wherein the length of the transmission tunneling protocol header is the length of the fixed header of the transmission tunneling protocol plus the length of the optional field;

when an extension header exists, acquire the length of the transmission tunneling protocol header according to the length of the fixed header of the transmission tunneling protocol, the length of the optional field, and a length of the extension header, wherein the length of the transmission tunneling protocol header is the length of the fixed header of the transmission tunneling protocol plus the length of the optional field plus the length of the extension header; and acquire the transmission tunneling protocol header according to the transmission network IP packet data and the length of the transmission tunneling protocol header, wherein the transmission tunneling protocol header is data starting after the transmission network protocol header in the transmission network IP packet data and corresponding to a length that is the length of the transmission tunneling protocol header.

12. The data transmission device according to claim 10, wherein:

the user data protocol header comprises a length of a user data IP protocol header and a user data transmission layer protocol header; and the memory further comprises instructions that, when executed by the processor, cause the data transmission device to:

when IP fragments exist in data carried by a transmission tunneling protocol, perform IP fragment reassembly for the data carried by the transmission tunneling protocol to acquire complete user data IP packet data, acquire the length of the user data IP protocol header according to a header of the user data IP packet data, acquire a protocol type of a user data transmission layer protocol according to a protocol type field in the header of the user data IP packet data, acquire the user data transmission layer protocol header and a corresponding field according to the protocol type of the user data transmission layer protocol, and acquire a length of the user data transmission layer protocol header according to the user data transmission layer protocol header and the corresponding field, acquire a length of the user data protocol header according to the length of the user data IP protocol header and the length of the user data transmission layer protocol header, wherein the length of the user data protocol header is the length of the user data IP protocol header plus the length of the user data transmission layer protocol header, and acquire the user data protocol header according to the transmission network IP packet data and the length of the user data protocol header, wherein the user data protocol header is data starting after the transmission tunneling protocol header in the transmission network IP packet data and corresponding to a length that is the length of the user data protocol header.

13. The data transmission device according to claim 10, wherein the memory further comprises instructions that, when executed by the processor, cause the data transmission device to:
   perform header compression for the transmission tunneling protocol header and the user data protocol header to obtain a first result of header compression;
   compress the user application layer data to obtain compressed user application layer data; and
   encode the first result of header compression and the compressed user application layer data to obtain the compressed transmission network protocol payload.

14. The data transmission device according to claim 10, wherein the memory further comprises instructions that, when executed by the processor, cause the data transmission device to:
   determine whether a length of the compressed IP data packet is greater than a length of a maximum transmission unit of a lower layer protocol;
   when the length of the compressed IP data packet is greater than the length of the maximum transmission unit of the lower layer protocol, perform IP fragmentation for the compressed IP data packet to obtain compressed IP data packet fragments, wherein the lower layer protocol comprises a protocol directly used to transmit the compressed IP data packet; and
   send the compressed IP data packet fragments to the core network or the base station.

\* \* \* \* \*